T

(12) United States Patent
Dillavou et al.

(10) Patent No.: US 9,940,750 B2
(45) Date of Patent: Apr. 10, 2018

(54) SYSTEM AND METHOD FOR ROLE NEGOTIATION IN MULTI-REALITY ENVIRONMENTS

(71) Applicant: VIPAAR, LLC, Birmingham, AL (US)

(72) Inventors: Marcus W. Dillavou, Birmingham, AL (US); Matthew Benton May, Birmingham, AL (US)

(73) Assignee: Help Lighting, Inc., Birmingham, AL (US)

( * ) Notice: Subject to any disclaimer, the term of this patent is extended or adjusted under 35 U.S.C. 154(b) by 0 days.

(21) Appl. No.: 13/929,080

(22) Filed: Jun. 27, 2013

(65) Prior Publication Data
US 2015/0002541 A1    Jan. 1, 2015

(51) Int. Cl.
*G09G 5/00*    (2006.01)
*G06T 19/00*    (2011.01)
*G06F 3/01*    (2006.01)
*A63F 13/65*    (2014.01)

(52) U.S. Cl.
CPC ............ G06T 19/006 (2013.01); G06F 3/011 (2013.01); G06T 19/00 (2013.01); *A63F 13/65* (2014.09); *A63F 2300/8082* (2013.01); *G06T 2219/024* (2013.01)

(58) Field of Classification Search
CPC .............................. G06T 19/006; G06T 19/00
USPC ........................................................ 345/633
See application file for complete search history.

(56) References Cited

U.S. PATENT DOCUMENTS

| 3,931,679 | A | 1/1976 | Carter |
| 4,601,664 | A | 7/1986 | Bertino et al. |
| 4,970,666 | A | 11/1990 | Welsh et al. |
| 5,102,340 | A | 4/1992 | Berlinghoff et al. |
| 5,391,081 | A | 2/1995 | Lampotang et al. |
| 5,403,192 | A | 4/1995 | Kleinwaks et al. |

(Continued)

FOREIGN PATENT DOCUMENTS

| AU | 2008270883 A1 | 1/2009 |
| AU | 2012295324 A1 | 3/2014 |

(Continued)

OTHER PUBLICATIONS

Victor Theoktisto, Marta Fairén, "Enhancing collaboration in virtual reality applications", Journal Computers and Graphics archive vol. 29 Issue 5, Oct. 2005 pp. 704-718.*

(Continued)

*Primary Examiner* — Jin Ge
(74) *Attorney, Agent, or Firm* — Baker & Hostetler LLP

(57) ABSTRACT

Provided herein are methods and systems for role negotiation with multiple sources. A method for role negotiation can comprise rendering a common field of interest that reflects a presence of a plurality of elements, wherein at least one of the elements is a remote element located remotely from another of the elements. A plurality of role designations can be received, each role designation associated with one of a plurality of devices, wherein at least one of the plurality of devices is a remote device located remotely from another of the plurality of devices. The common field of interest can be updated based upon the plurality of role designations, wherein each of the plurality of role designations defines an interactive functionality associated with the respective device of the plurality of devices.

22 Claims, 30 Drawing Sheets

(56) References Cited

U.S. PATENT DOCUMENTS

| | | |
|---|---|---|
| 5,584,701 A | 12/1996 | Lampotang et al. |
| 5,668,608 A | 9/1997 | Lee |
| 5,769,641 A | 6/1998 | Lampotang et al. |
| 5,772,442 A | 6/1998 | Lampotang et al. |
| 5,779,484 A | 7/1998 | Lampotang et al. |
| 5,853,292 A | 12/1998 | Eggert et al. |
| 5,868,579 A | 2/1999 | Lampotang et al. |
| 5,882,207 A | 3/1999 | Lampotang et al. |
| 5,890,908 A | 4/1999 | Lampotang et al. |
| 5,900,923 A | 5/1999 | Prendergast et al. |
| 5,941,710 A | 8/1999 | Lampotang et al. |
| 6,042,477 A | 3/2000 | Addink |
| 6,157,677 A | 12/2000 | Martens et al. |
| 6,166,744 A | 12/2000 | Jaszlics et al. |
| 6,193,519 B1 | 2/2001 | Eggert et al. |
| 6,220,866 B1 | 4/2001 | Amend et al. |
| 6,241,609 B1 | 6/2001 | Rutgers |
| 6,246,975 B1 | 6/2001 | Rivonelli et al. |
| 6,257,234 B1 | 7/2001 | Sun |
| 6,273,728 B1 | 8/2001 | van Meurs et al. |
| 6,293,519 B1 | 9/2001 | Farretta |
| 6,301,339 B1 | 10/2001 | Staples et al. |
| 6,317,165 B1 | 11/2001 | Balram et al. |
| 6,443,735 B1 | 9/2002 | Eggert et al. |
| 6,461,165 B1 | 10/2002 | Takashina et al. |
| 6,503,087 B1 | 1/2003 | Eggert et al. |
| 6,527,558 B1 | 3/2003 | Eggert et al. |
| 6,535,714 B2 | 3/2003 | Melker et al. |
| 6,570,563 B1 | 5/2003 | Honda |
| 6,608,628 B1 | 8/2003 | Ross et al. |
| 6,692,258 B1 | 2/2004 | Kurzweil et al. |
| 6,697,451 B2 | 2/2004 | Acharya et al. |
| 6,747,672 B1 | 6/2004 | Haakonsen et al. |
| 6,747,674 B1 | 6/2004 | Asami |
| 6,758,676 B2 | 7/2004 | Eggert et al. |
| 6,774,855 B2 | 8/2004 | Bateman et al. |
| 6,774,885 B1 | 8/2004 | Even-Zohar |
| 6,780,016 B1 | 8/2004 | Toly |
| 6,921,267 B2 | 7/2005 | van Oostrom et al. |
| 7,015,954 B1 | 3/2006 | Foote et al. |
| 7,181,690 B1* | 2/2007 | Leahy et al. ............ 715/706 |
| 7,190,331 B2 | 3/2007 | Genc et al. |
| 7,259,761 B2 | 8/2007 | Shih et al. |
| 7,367,809 B2 | 5/2008 | Takahashi |
| 7,373,377 B2 | 5/2008 | Altieri |
| 7,376,903 B2 | 5/2008 | Morita et al. |
| 7,403,664 B2 | 7/2008 | Porikli et al. |
| 7,728,852 B2 | 6/2010 | Suzuki et al. |
| 7,728,868 B2 | 6/2010 | Razzaque et al. |
| 7,787,927 B2 | 8/2010 | Wood et al. |
| 7,815,644 B2 | 10/2010 | Masini |
| 7,949,616 B2 | 5/2011 | Levy et al. |
| 8,046,408 B2 | 10/2011 | Torabi |
| 8,179,412 B2 | 5/2012 | Swanson |
| 8,336,777 B1 | 12/2012 | Pantuso et al. |
| 8,385,687 B1 | 2/2013 | Blais-Morin |
| 8,398,541 B2 | 3/2013 | DiMaio et al. |
| 8,520,024 B2 | 8/2013 | Guthrie et al. |
| 8,902,248 B1 | 12/2014 | Bidarkar et al. |
| 9,020,203 B2 | 4/2015 | Dillavou et al. |
| 2001/0026630 A1 | 10/2001 | Honda |
| 2002/0049510 A1 | 4/2002 | Oda et al. |
| 2003/0219146 A1 | 11/2003 | Jepson et al. |
| 2004/0009459 A1 | 1/2004 | Anderson et al. |
| 2004/0091845 A1 | 5/2004 | Azerad et al. |
| 2004/0161731 A1 | 8/2004 | Arington et al. |
| 2004/0189701 A1 | 9/2004 | Badt, Jr. |
| 2004/0193441 A1 | 9/2004 | Altieri |
| 2004/0260170 A1 | 12/2004 | Wood et al. |
| 2005/0074154 A1 | 4/2005 | Georgescu et al. |
| 2005/0197818 A1 | 9/2005 | Monfared et al. |
| 2005/0203367 A1 | 9/2005 | Ahmed et al. |
| 2005/0203380 A1 | 9/2005 | Sauer et al. |
| 2005/0267778 A1 | 12/2005 | Kazman |
| 2005/0273185 A1 | 12/2005 | Teiwes et al. |
| 2005/0289472 A1 | 12/2005 | Morita et al. |
| 2006/0187224 A1 | 8/2006 | Ehrlich |
| 2007/0018975 A1 | 1/2007 | Chuanggui et al. |
| 2007/0048702 A1 | 3/2007 | Jang et al. |
| 2007/0055578 A1 | 3/2007 | Ashton |
| 2007/0064098 A1 | 3/2007 | Tran |
| 2007/0149290 A1 | 6/2007 | Nickell et al. |
| 2007/0248261 A1 | 10/2007 | Zhou et al. |
| 2008/0024594 A1 | 1/2008 | Ritchey |
| 2008/0025640 A1 | 1/2008 | Trudeau et al. |
| 2008/0055305 A1 | 3/2008 | Blank et al. |
| 2008/0079752 A1* | 4/2008 | Gates et al. ............ 345/633 |
| 2008/0123910 A1 | 5/2008 | Zhu |
| 2008/0123927 A1 | 5/2008 | Miga et al. |
| 2008/0158333 A1 | 7/2008 | Krisbergh et al. |
| 2008/0231626 A1 | 9/2008 | Mohamed et al. |
| 2008/0278633 A1 | 11/2008 | Tsoupko-Sitnikov et al. |
| 2009/0058987 A1 | 3/2009 | Thielman et al. |
| 2009/0287089 A1 | 11/2009 | Spector |
| 2009/0300122 A1 | 12/2009 | Freer |
| 2010/0141555 A1 | 6/2010 | Rorberg et al. |
| 2010/0226564 A1 | 9/2010 | Marchesotti et al. |
| 2010/0241953 A1 | 9/2010 | Kim et al. |
| 2010/0295921 A1* | 11/2010 | Guthrie et al. ............ 348/14.08 |
| 2010/0315418 A1 | 12/2010 | Woo |
| 2011/0018959 A1 | 1/2011 | Friel et al. |
| 2011/0084983 A1 | 4/2011 | Demaine |
| 2011/0116703 A1 | 5/2011 | Fu et al. |
| 2011/0135206 A1 | 6/2011 | Miura et al. |
| 2011/0183182 A1 | 7/2011 | Woehrle et al. |
| 2011/0188744 A1 | 8/2011 | Sun |
| 2011/0216060 A1* | 9/2011 | Weising et al. ............ 345/419 |
| 2011/0249029 A1 | 10/2011 | Baumgart |
| 2011/0270135 A1 | 11/2011 | Dooley et al. |
| 2012/0133786 A1 | 5/2012 | Watanabe et al. |
| 2012/0201456 A1 | 8/2012 | El-Mahdy et al. |
| 2012/0263154 A1* | 10/2012 | Blanchflower et al. ...... 370/338 |
| 2012/0320157 A1* | 12/2012 | Junuzovic et al. ............ 348/46 |
| 2012/0324332 A1 | 12/2012 | Zaragoza et al. |
| 2013/0038632 A1* | 2/2013 | Dillavou et al. ............ 345/633 |
| 2013/0083063 A1* | 4/2013 | Geisner et al. ............ 345/633 |
| 2013/0308827 A1 | 11/2013 | Dillavou et al. |
| 2014/0176533 A1 | 6/2014 | Dillavou et al. |

FOREIGN PATENT DOCUMENTS

| | | |
|---|---|---|
| CA | 2694095 A1 | 1/2009 |
| CN | 101405769 A | 4/2009 |
| CN | 101743567 A | 6/2010 |
| CN | 104011741 A | 8/2014 |
| EP | 1804209 A1 | 7/2007 |
| EP | 2163092 A2 | 3/2010 |
| EP | 2742461 A1 | 6/2014 |
| IN | 7420/CHENP/2009 | 7/2010 |
| JP | 05227463 A | 9/1993 |
| JP | 2002074370 | 3/2002 |
| JP | 2007535875 A | 12/2007 |
| JP | 2009134693 A | 6/2009 |
| JP | 2010-508631 A | 3/2010 |
| JP | 2010-141476 A | 6/2010 |
| JP | 2010-528354 A | 8/2010 |
| JP | 2013-024298 A | 2/2013 |
| NZ | 582133 A | 12/2012 |
| NZ | 621149 A | 12/2015 |
| WO | WO 96/09722 | 3/1996 |
| WO | 00/48475 A1 | 8/2000 |
| WO | WO 00/49475 | 8/2000 |
| WO | WO 2005/119554 | 12/2005 |
| WO | WO 2006/108279 | 10/2006 |
| WO | WO 2007/059477 | 5/2007 |
| WO | WO 2009/005901 | 1/2009 |
| WO | WO 2013/025457 | 2/2013 |

(56) References Cited

FOREIGN PATENT DOCUMENTS

| WO | WO 2013/177125 | 11/2013 |
|----|----------------|---------|
| WO | WO 2014/105961 | 7/2014  |

OTHER PUBLICATIONS

Víctor Theoktisto, Marta Fairén, "Enhancing collaboration in virtual reality applications", Journal Computers and Graphics archive vol. 29 Issue 5, Oct. 2005 pp. 704-718.*
Ai, Tele-Immersive Medical Educational Environment, University of Illinois at Chicago, VRMedlab, School of Biomedical and Health Information Sciences, pp. 1-7.
Akatsuka, Compensation for End to End Delays in a VR System, Proceedings of IEEE Virtual Reality Annual International Symposium, 1998, pp. 156-159.
Ballantyne, The da Vinci Telerobotic Surgical Systems: The Virtual Operative Field and Telepresence Surgery, Surgical Clinics of North America, 2003, vol. 83, pp. 1293-1304.
Billinghurst, Mixing Realities in Shared Space: An Augmented Reality Interface for Collarborative Computing, 2000, pp. 1641-1644.
Billinghurst, Real World Teleconferencing, pp. 1-5.
Birkfellner, Computer-Enhanced Stereoscopic Vision in a Head-Mounted Operating Binocular, Physics in Medicine and Biology, 2003, vol. 48, No. 3, pp. 49-57.
Danglemaier, Virtual and Augmented Reality Support for Discrete Manufacturing System Simulation, Computers in Industry, 2005, vol. 56, pp. 371-383.
Gibson, Simulating Surgery Using Volumetric Object Representations, Real-Time Volume Rendering and Haptic Feedback, Mitsubishi Research Laboratories, 1997, pp. 1-21.
Hamza-Lup, A Distributed Augmented Reality System for Medical Training and Simulation, School of Computer Science, University of Central Florida, pp. 1-18.
Haluck, Reliability and Validity of Endotower, a Virtual Reality Trainer for Angled Endoscope Navigation, Medicine Meets Virtual Reality, 2002, pp. 1-6, IOS Press.
Kurosaki, Skill Transmission for Hand Positioning Task Through View-Sharing System, Graduate School of Information Science and Technology, Osaka University, 2011, pp. 1-4.
Nicolau, An Augmented Reality System to Guide Radio-Frequency Tumour Ablation, Journal Computer Animation and Virtual Worlds, 2004, pp. 1-13.
Nishikawa, Mutual View Sharing System for Real-Time Telecommunication, Systems and Computers in Japan, 2006, vol. 37, No. 14, pp. 292-304.
Paul, Augmented Virtuality Based on Stereoscopic Reconstruction in Multimodal Image-Guided Neurosurgery: Methods and Performance Evaluation, IEEE Trans Med Imaging, 2005, vol. 24, No. 11, pp. 1500-1511.
Satava, Medical Applications of Virtual Reality, Journal of Medical Systems, 1995, vol. 19, No. 3, pp. 275-280.
Shuhaiber, Augmented Reality in Surgery, Arch Surg, 2004, vol. 139, pp. 170-174.
So, Experimental Studies of the Use of Phase Lead Filters to Compensate Lags in Head-Coupled Visual Displays, IEEE Transactions on Systems, Man, and Cybernetics—Part A: Systems and Humans, 1996, vol. 26, No. 4, pp. 445-454.
Soler, Virtual Reality, Augmented Reality and Robotics in Surgical Procedures of the Liver, Perspectives in Image Guided Surgery, 2004, pp. 476-484.
Stafford, User Evaluation of God-Like Interaction Techniques, Proc. 9th Australasian User Interface Conference (AUIC2008), School of Computer and Information Science, University of South Australia, pp. 19-28.
Taffinder, Validation of Virtual Reality to Teach and Assess Psychomotor Skills in Laparascopic Surgery: Results from Randomized Controlled Studies Using the MIST VR Laparascopic Simulator, Medicine Meets Virtual Reality, 1998, pp. 124-133.

Viciana-Abad, A Preliminary Study of Presence in Virtual Reality Training Simulation for Medical Emergencies, Medicine Meets Virtual Reality, 2004, vol. 12, pp. 394-396.
Vogt, An AR System with Intuitive User Interface for Manipulation and Visualization of 3D Medical Data, Medicine Meets Virtual Reality, 2004, vol. 12, pp. 397-403, IOS Press.
Wann, Natural Problems for Stereoscopic Depth Perception in Virtual Environments, Vision Res., 1995, vol. 35, No. 19, pp. 2731-2736.
European Search Report issued Sep. 15, 2011 for European Patent Application No. 08826034, pp. 1-9.
Written Opinion of International Searching Authority dated Dec. 17, 2008 for International Patent Application No. PCT/US2008/064118, pp. 1-5.
International Search Report and Written Opinion of International Searching Authority dated Oct. 16, 2012 for International Patent Application No. PCT/US2012/050238, pp. 1-7.
International Search Report issued Dec. 2, 2013 for International Patent Application No. PCT/US2013/041967, pp. 1-3.
International Search Report issued Apr. 15, 2014 for International Patent Application No. PCT/US2013/077824, pp. 1-2.
Newman et al. A Desk Supporting Computer-based Interaction with Paper Documents; Rank Xerox EuroPARC, United Kingdom, 1992 ACM 0-89791-513-5/92/0005-0587, pp. 587-592.
Greenberg, An Annotated Bibliography of Computer Supported Cooperative Work, SIGCHI Bulletin, Jul. 1991, vol. 23, No. 3, pp. 29-62.
Ishii et al. ClearBoard: A Seamless Medium for Shared Drawing and Conversation with Eye Contact, NTT Human Interface Laboraties, Kanagawa, Japan, 1992 ACM 0-89791-513-5/92/0005-0525, pp. 525-532, Exh. 705-706.
Takemura et al. Cooperative Work Environment Using Virtual Workspace, ATR Communication Systems Research Laboratories, Kyoto, Japan, 1992 ACM 0-89791-543-7/92/0226; CSCW 92 Proceedings, Nov. 1992, pp. 226-232.
Greenberg, CSCW '92 Formal Video Program, Department of Computer Science, University of Calgary, 1992, pp. 9-10.
Chang, et al., Design and Model for a Computer Supported Cooperative Environment for CASE and CAD Applications, Department of Computer Science and Engineering, Auburn University, 1997 ACM 0-8971-925-4, pp. 191-198.
Kobayashi et al., DispLayers: Multi-Layer display Technique to Enhance Selective Looking of Overlaid Images, NTT Human Interface Laboraties, Kanagawa, Japan, p. 66.
Streitz et al., DOLPHIN: Integrated Meeting Support Across Local and Remote Desktop Environments and LiveBoards, PSI—Integrated Publication and Information Systems Institute, GMD— German National Research Center for Computer Science, Conference Paper Oct. 1994, 1994 ACM 0-89791-689-1/94; pp. 345-358.
Ishii, et al., Beyond Videophones: Team WorkStation-2 for Narrowband ISDN, NTT Human Interface Laboratories, Japan; Proceedings of the Third European Conference on Computer supported Cooperative Work Sep. 13-17, 1993, Milan, Italy, ESCSW '93, pp. 325-326.
Ishii, et al., Integration of Interpersonal Space and Shared Workspace: ClearBoard Design and Experiments, NTT Human Interface Laboraties and University of California, Irvine, ACM Transactions on Information Systems, vol. 11, No. 4, Oct. 1993, pp. 349-375.
Yamazaki, et al., GestureLaser and GestureLaser Car, Devleopment of an Embodied Space to Support Remote Instruction, Proceedings of the Sixth European Conference on Computer-Supported Cooperative Work, Sep. 12-16, 1999, Copehangen Denmark; 1999 Kluwer Academic Publishers, pp. 239-258.
Hayne, et al., Implementing Gesturing With Cursors in Group Support Systems, Journal of Management Information Systems, Winter 1993-94, vol. 10, No. 3, pp. 43-61.
Ishii et al., Iterative Design of Seamless Collaboration Media, Communications of the ACM, Aug. 1994, vol. 17, No. 8, pp. 83-97.
Ishii et al., Towawrd an Open Shared Workspace: Computer and Video Fusion Approach of Teamworkstation, Communications of the ACM, Dec. 1991, vol. 34, No. 12, pp. 37-50.

(56) References Cited

OTHER PUBLICATIONS

Ishii, Integration of Shared Workspace and Interpersonal Space for Remote Collaboration, Computer Supported Cooperative Work, 1999 John Wiley & Sons, Ltd. pp. 83-101.
Ishii, Translucent Multiuser Interface for Realtime Collaboration, IEICE trans. Fundamentals, vol. E75-A, No. 2 Feb. 1992, pp. 122-131.
Foreman, Managing Data in Distributed Multimedia Conferencing Applications, IEEE MultiMedia, Oct.-Dec. 2002, pp. 30-37.
Kuzuoka, Spatial Workspace Collaboration: A Sharedview Video Support System for Remote Collaboration Capability, Department of Mechano-Informatics, University of Tokyo, 1992 ACM 0-89791-513-5/92/005-0533, pp. 533-540.
Graves, et al. Supporting Learners in a Remote CSCL Environment: the Importance of Task and Communication, Dept. of Computer Science, University of British Columbia, 11 pgs.
Ishii, Position Paper for ECSCW '91 Workshop on Open CSCW Systems Toward an Open Shared Workspace: Computer and Video Fusion Approach of Team WorkStation, NTT Human Interface Laboratories, Kanagawa, Japan, 4 pgs.
Apperley, et al. Use of Video Shadow for Small Group Interaction Awareness on a Large Interactive Display Surface, The Computer Science Department, University of Waikato, New Zealand, 2002, Australian Computer Society, Inc., 10 pgs.
Kling, Cooperation, Coordination and Control in Computer-Supported Work, Communications of the ACM, Dec. 1991, vol. 34, No. 12, pp. 83-88.
Rosenberg, Update on National Science Foundation Funding of the "Collaboratory", Communications of the ACM, Dec. 1991, vol. 34, No. 12, p. 83.
Norman, Collaborative Computing: Collaboration First, Computing Second, Communications of the ACM, Dec. 1991, vol. 34, No. 12, p. 88-90.
Pendergast, A Comparative Analysis of Groupware Application Protocols, ACM SIGCOMM, Computer Communication Review, pp. 28-40.
Press, Collective Dynabases, Communications of the ACM, Jun. 1992, vol. 35, No. 6, pp. 26-32.
Reeves et al., Supporting Communication Between Designers with Artifact-Centered Evolving Information Spaces, Department of Computer Science and Institute of Cognitive Science, University of Color-401ado, 1992 ACM 0-89791-543-7/92/0010/0394, CSCW 92 Proceedings, Nov. 1992, pp. 394.
Tani et al., Courtyard: Integrating Shared Overview on a Large Screen and Per-User Detail on Individual Screens, Hitachi Research Laboratory, Hitachi, Ltd., Human Factors in Computing Systems, 1994 ACM 0-89791-650-6/94/0044, pp. 44-50.
Takemura et al., Cooperative Work Environment Using Virtual Workspace, ATR Communication Systems Research Laboratories, 1992 ACM 0-089791-543-7/92/001010226, CSCW 92 Proceedings, Nov. 1992, pp. 226-232.
Wellner, Interacting With Paper on the Digital Desk, Communication of the ACM, Jul. 1993, vol. 36, No. 7, pp. 87-96.
Wiberg, RoamWare: An Integrated Architecture for Seamless Interaction in Between Mobile Meetings, Department of Informatics, Umea University, Sweden, 2001 acm 1-58113-294-8/01/0009, pp. 288-297.
Veltman, Frontiers in Electronic Media, Interactions Jul. & Aug. 1997, pp. 32-66.
Fouss, et al., Classifying Groupware, Department of Computer Science and Software Engineering, Auburn University, 2000 ACM 1-58113-250-6/00/0004, pp. 117-124.
Mandviwalla et al., What Do Groups Need? A Proposed Set of Generic Groupware Requirements, 1994 ACM 1073-0516/94/0900-0245, ACM Transactions on Computer-Human Interaction, vol. 1, No. 3, Sep. 1994, pp. 245-268.
Bly, et al., Media Spaces: Bringing People Together in a Video, Audio, and Computing Environment, Communications of the ACM, Jan. 1993, vol. 36, No. 1, pp. 27-47.
Ishii, et al., Integration of Inter-personal Space and Shared Workspace: ClearBoard Design and Experiments, NTT Human Interface Laboraties and University of California, Irvine, CSCW 92 Proceedings, Nov. 1992, pp. 33-42.
Anupam, et al., Collaborative Multimedia Scientific Design in SHASTRA, Department of Computer Sciences, Purdue University, West Lafayette, Indiana, 12 pgs.
Allen, Groupware and social Reality, Department of Information and Computer Science, University of California, Irvine, Computers & Society, vol. 22, No. 1-4, Oct. 1992, pp. 24-28.
Hunter, et al., WaaZam! Supporting Creative Play at a Distance in Custo-1206mized Video Environments, CHI 2014, Apr. 26-May 1, 2014, Toronto, ACM 978-1-4503-2473-1/14/04, pp. 1197-1206.
Franck, et al., Putting Innovation to Work: Adoption Strategies for MultiMedia Communication Systems, Communication of the ACM, Dec. 1991, vol. 34, No. 12, pp. 53-63.
Gross, Recognizing and Interpreting Diagrams in Design, Division of Environmental Design and Institute of Cognitive Science, University of Colorado, 1994 ACM 0-89791-733-2/94/0010, pp. 88-94.
Yonekura T et al., "Peer to Peer Networked Field-type virtual Environment by Using AtoZ", Cyberworlds, 2004 International Conference on Tokyo, Japan, Nov. 18-20, 2004, Piscataway, NJ, USA, IEEE, Nov. 18, 2004, pp. 241-248.
U.S. Provisional Patent Application Field on May 18, 2007 by Barton Guthrie et al., U.S. Appl. No. 60/930,874.
U.S. Provisional Application Field on Feb. 2, 2006 by Danny Murphy., U.S. Appl. No. 60/764,508.
U.S. Provisional Application Field on Nov. 11, 2005 by Danny Murphy., U.S. Appl. No. 60/735,458.
Shenai Mahesh B et al., "Virtual Interactive Presence and Augmented Reality (VIPAR) for Remote Surgical Assistance", Neurosurgery, Williams & Wilkins, Baltimore, MD, USA, vol. 68, No. 3, Suppl. 3, Mar, 1, 2011, pp. 200-2007.
James Davis et al., "The Effects of Time Lag on Driving Performance and a Possible Mitigation", IEEE Transactions On Robotics, IEEE Service Center, Piscataway, NJ, USA, vol. 26, No. 3, Jun. 1, 2010, pp. 590-593.
DeVincezi, et al., Kinected Conference: Augmenting Video Imaging with Calibrated Depth and Audio, CSCW 2011, Mar. 19-23, 2011, Hangzhou, China, ACM 978-1-4503-0556-3/11/03, pp. 621-624.
Chong N Y et al., "A Collaborative Multi-site Teleoperation Over an ISDN", Mechatronics, Pergamon Press, Oxford, GB, vol. 13, No. 8-9, Oct. 1, 2003, pp. 957-979.
Alex T. Pang et al., "Apporaches to Uncertainty Visualization", The Visual Computer, vol. 13, No. 8, Nov. 18, 1997, pp. 370-390.
Chong et al., "A Collaborative multi-site Teleoperation over an ISDN", Mechatronics, Pergamon Press, Oxford, GB, vol. 13, No. 8-9, pp. 957-979, 2002.
Yonekura et al., "Peer-to-Peer Networked Field Type Virtual Environment by Using AtoZ" Cyberworlds, 2004 International Conference on Tokyo, Japan Nov. 18-20, 2004, pp. 241-248.

\* cited by examiner

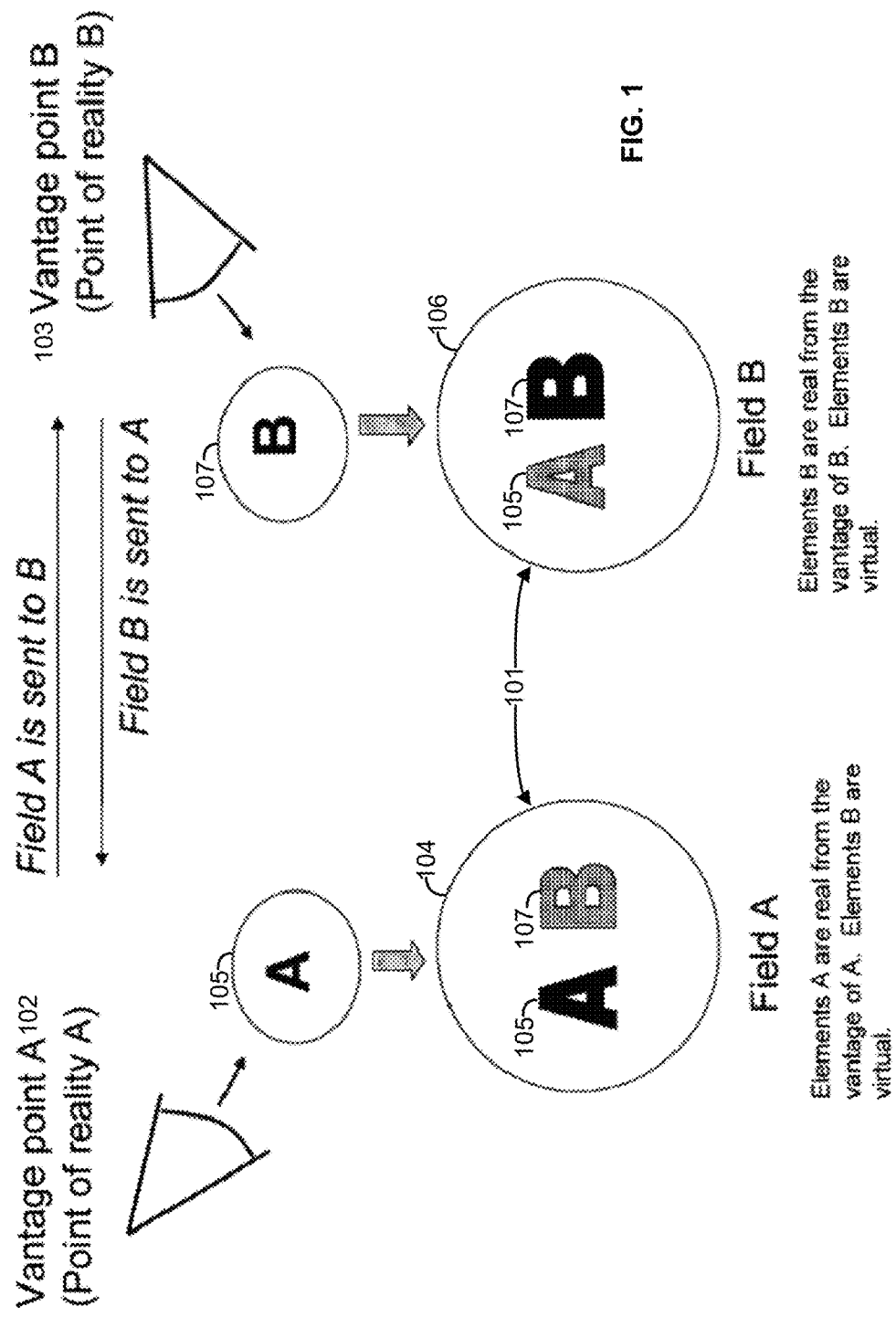

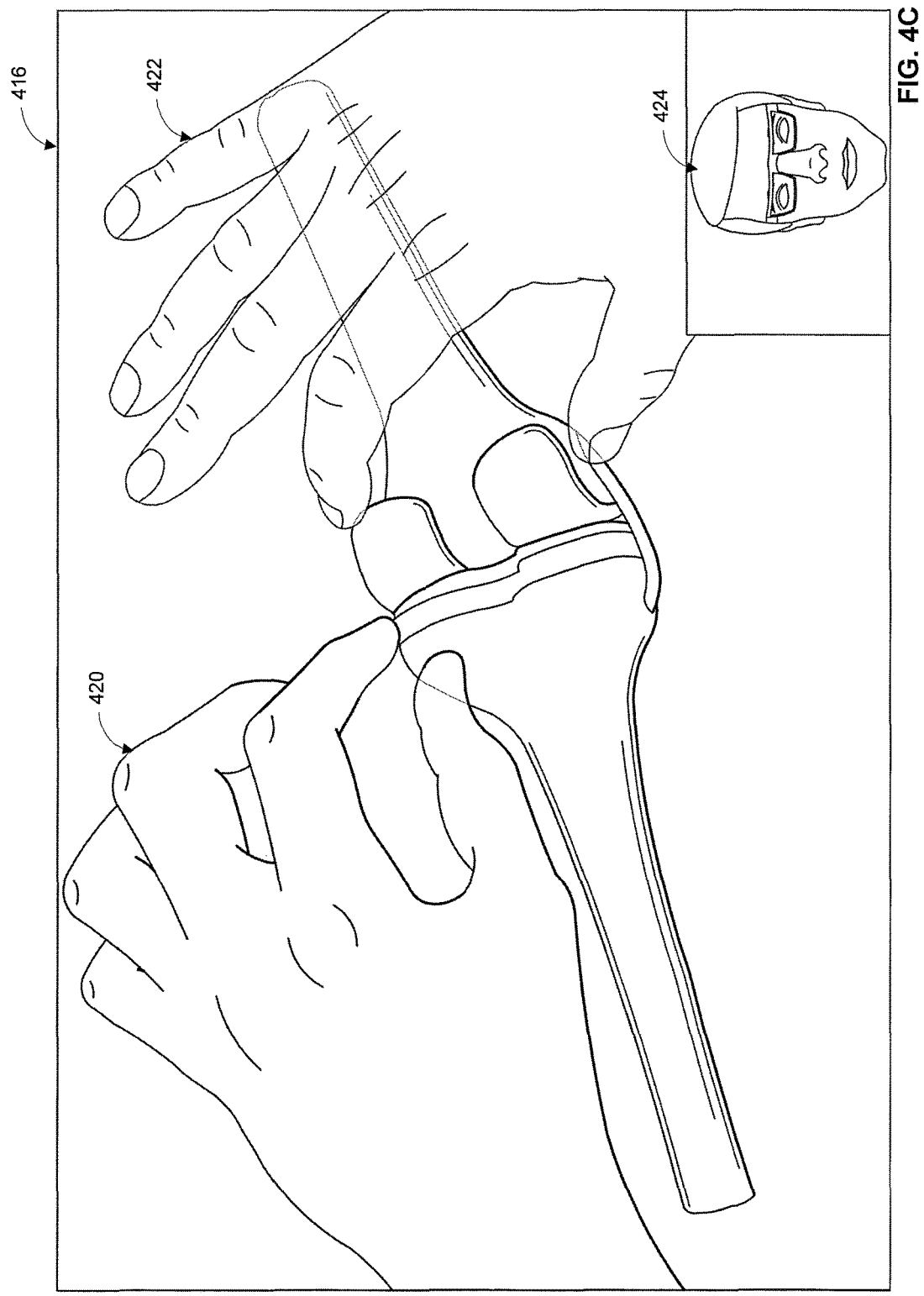

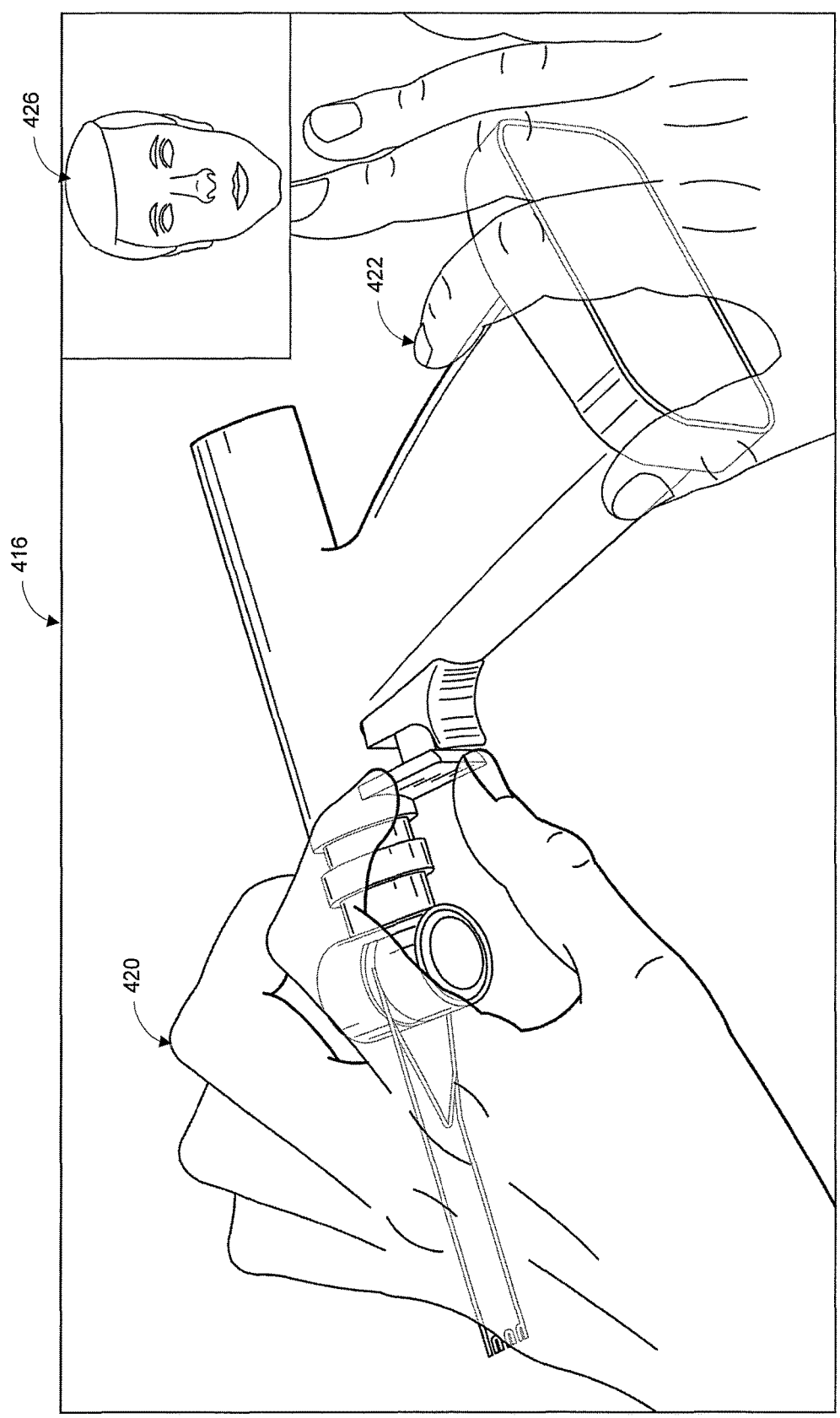

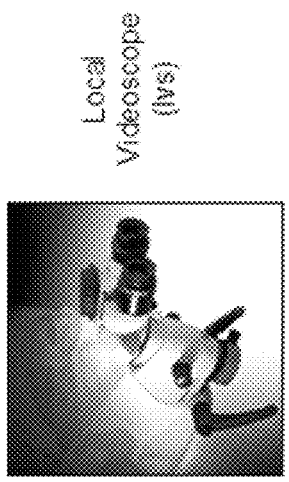
Local Videoscope (lvs)
Local Expert
FIG. 13
Virtual field as seen by local expert. Local expert (le) hand assisting in virtual field
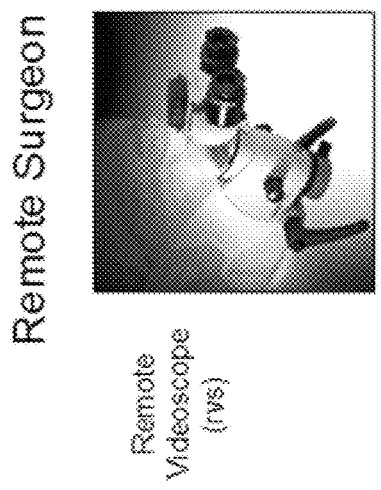
Remote Surgeon
Remote Videoscope (rvs)
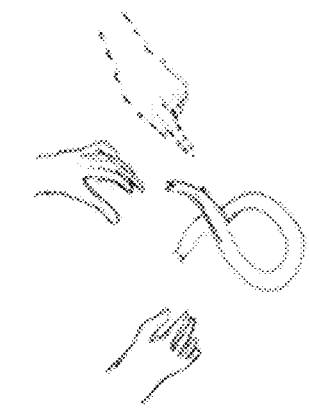
Remote field showing virtual (local) expert (le) hand helping with task

FIG. 14

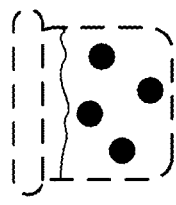

Slices of MRI scan of beaker of object.

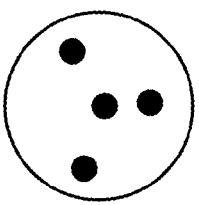

Computer volume rendering of "virtual beaker."

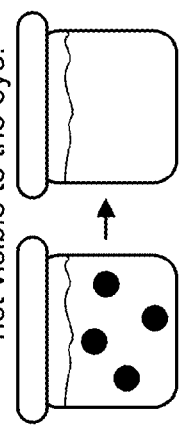

Objects suspended in beaker of opaque gelatin. Objects are not visible to the eye.

Real and virtual beaker as viewed through a videoscope.

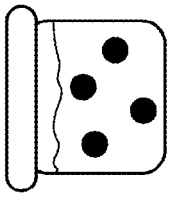

User interface within the videoscope enables user to scale/rotate virtual beaker so that it is superimposed onto real beaker.

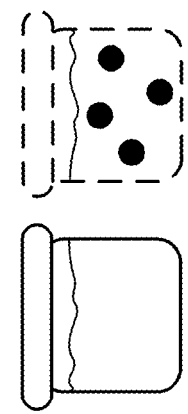

Once merged, the user can use the virtual beaker to navigate within the real beaker.

SYSTEM AND METHOD FOR ROLE NEGOTIATION IN MULTI-REALITY ENVIRONMENTS

BACKGROUND

Mixed reality systems enable physically separated users to engage in multi-reality sessions in real-time. These systems may perform some degree of image processing to enable such sessions. Users participating in multi-reality sessions with other concurrent users may be operating in a particular role relative to the other users. However, mixed reality systems do not provide a sufficient means to negotiate changes to a user's role in real-time.

SUMMARY

It is to be understood that both the following general description and the following detailed description are exemplary and explanatory only and are not restrictive, as claimed. Disclosed are systems and methods for role switching in multi-reality environments. In an aspect, the systems and methods of the present disclosure can comprise designating a role for one or more users. As such, processing of one or more images or video can be configured for the designated role. In another aspect, the systems and methods of the present disclosure can comprise negotiating one or more roles for one or more users. Interactive functionality can be associated with the one or more roles and can be selectively assigned to one or more users to provide an improved user experience.

Methods are described for role negotiation. One method can comprise rendering a common field of interest that reflects a presence of a plurality of elements, wherein at least one of the elements is a remote element located remotely from another of the elements. A plurality of role designations can be received. Each role designation can be associated with one of a plurality of devices, wherein at least one of the plurality of devices is a remote device located remotely from another of the plurality of devices. The common field of interest can be updated based upon the plurality of role designations, wherein each of the plurality of role designations defines an interactive functionality associated with the respective device of the plurality of devices.

Another method can comprise rendering a common field of interest that reflects a presence of a plurality of elements, wherein at least one of the elements is a remote element located remotely from another of the elements. A plurality of role designations can be received, each role designation associated with one of a plurality of devices. At least one of the plurality of devices is a remote device located remotely from another of the plurality of devices. One or more of the ingress and egress of information can be managed to one or more of the plurality of devices based upon one or more of the plurality of role designations, wherein each of the plurality of role designations defines a transmission rule for managing ingress and egress of information associated with the respective device of the plurality of devices.

A system for image processing is described. The system can comprise a display configured for displaying a common field of interest, a sensor configured for obtaining image data, a processor in signal communication with the display and the sensor. The processor can be configured to render a common field of interest that reflects a presence of a plurality of elements, wherein at least one of the elements is a remote element located remotely from another of the elements. The processor can be configured to receive a role designation. The processor can be configured to manage one or more of the ingress and egress of information based upon the role designation. The processor can be configured to update the common field of interest based upon the one or more of the ingress and egress of information and output the updated common field of interest to the display.

Additional advantages will be set forth in part in the description which follows or may be learned by practice. The advantages will be realized and attained by means of the elements and combinations particularly pointed out in the appended inventive concepts. It is to be understood that both the foregoing general description and the following detailed description are exemplary and explanatory only and are not to be considered restrictive.

BRIEF DESCRIPTION OF THE DRAWINGS

The accompanying drawings, which are incorporated in and constitute a part of this specification, illustrate embodiments and together with the description, serve to explain the principles of the methods and systems provided:

FIG. 1 illustrates virtual interactive presence;
FIG. 4C illustrates an exemplary user interface;
FIG. 4F illustrates an exemplary user interface;
FIG. 13 illustrates virtual presence in a remote surgical environment;
FIG. 14 illustrates merging of medical imaging with an operative field.

DETAILED DESCRIPTION

Figure 2A:
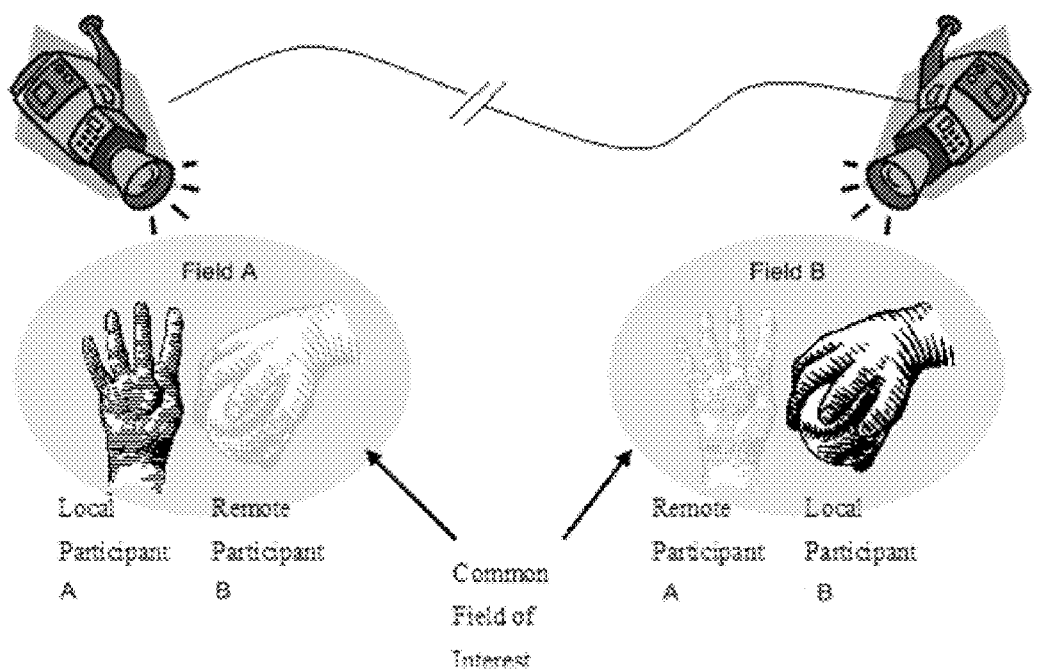
FIG. 2A illustrates virtual interactive presence.

Before the present methods and systems are disclosed and described, it is to be understood that the methods and systems are not limited to specific synthetic methods, specific components, or to particular compositions, as such may, of course, vary. It is also to be understood that the terminology used herein is for the purpose of describing particular embodiments only and is not intended to be limiting.

As used in the specification and the appended inventive concepts, the singular forms "a," "an," and "the" include plural referents unless the context clearly dictates otherwise.

Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the Examples included therein and to the Figures and their previous and following description.

Disclosed are methods and systems for role designation with multiple video streams. The disclosed methods and systems can utilize virtual reality. Virtual reality (VR) refers to a computer-based application which provides a human-computer interface such that the computer and its devices create a sensory environment which is dynamically controlled by the actions of the individual, so that the environment appears "real" to the user. With VR, there is communication between a computer system and a user. The computer creates a sensory environment for the user to experience which may be, in one aspect, multisensory (although this is not essential) and the computer creates a sense of reality in response to user inputs.

In one exemplary aspect, the system disclosed can utilize at least two types of VR, Immersive and Non-immersive Immersive VR creates the illusion that the user is actually in a different environment. In one aspect, the system accomplishes this through the use of such devices as Head Mounted Displays (HMD's), earphones, and input devices such as gloves or wands. In another aspect, in order to enhance to realism of the experience, a plurality of Degrees of Freedom (DOF's) are utilized, which the software can simulate. Generally, the more the DOF's, the better the realism of the experience. Exemplary DOF's include, without limitation: X, Y, Z, roll, pitch, and yaw.

Non-immersive VR creates an environment that is differentiable from the user's surrounding environment. It does not give the illusion that the user is transported to another world. Non-immersive VR works by creating a 3-dimensional image and surround sound through the use of stereo projection systems, computer monitors, and/or stereo speakers. Non-immersive VR can be run from a personal computer without added hardware.

In one aspect, movement in Immersive VR can be realized by a system through the use of optical, acoustical, magnetic, or mechanical hardware called trackers. Preferably, the input devices have as many of these trackers as possible, so that movement can be more accurately represented. For instance, virtual gloves can have up to 3 trackers for each index, and more for the palm and wrist, so that the user can grab and press objects. In one aspect, the trackers can be equipped with positioning sensors, that tell a computer which direction the input is facing and how the input device is tilted in all directions. This gives a sensor with six degrees of freedom.

Output devices bring the user to the virtual world. An example of an output device that can be used in the present system include, without limitation, head mounted displays (HMD) in the form of glasses or goggles, which allow a user to wear a display system on their head. One approach to the HMD is to use a single Liquid Crystal Display (LCD), wide enough to cover both eyes. Another approach is to have two separated displays—one for each eye. This takes somewhat more computer power, since the images displayed are different. Each display has a separate image rendered from the correct angle in the environment. Eye-tracking can be combined with HMDs. This can allow, for example, surgeons to move their eyes to the part of an image they want to enhance.

Another example of an output device that can be used in an embodiment of the present system is shuttered glasses. This device updates an image to each eye every other frame, with the shutter closed on the other eye. Shuttered glasses require a very high frame rate in order to keep the images from flickering. This device is used for stereo monitors, and gives an accurate 3-d representation of a 2-d object, but does not immerse the user in the virtual world.

Another output device that can be used in an embodiment of the present system is a screen with multiple projectors. The screen can be either a plane or bent. A challenge when using multiple projectors on the same screen is that there can be visible edges between the projections. This can be remedied be using a soft-edge system wherein the projection goes more and more transparent at the edges and the projections overlap. This produces an almost perfect transition between the images. In order to achieve a desired 3D effect, shuttered glasses can be used. Special glasses can be used, that alternate between making the glass either completely opaque or completely transparent. When the left eye is opaque, the right one is transparent. This is synchronized to the projectors that are projecting corresponding images on the screen.

In another aspect, a Cave Automatic Virtual Environment (CAVE) can also be used in the present system. A CAVE can use mirrors in a cube-shaped room to project stereo images onto the walls, giving the illusion that you are standing in a virtual world. The world is constantly updated using trackers, and the user is allowed to move around almost completely uninhibited.

Disclosed are methods and systems for role designation. Such methods and systems can render a number of elements/participants virtually present into a field of interest in a manner such that the users can interact for any given purpose, such as the delivery of remote expertise. A field of interest can comprise varying amounts of "real" and "virtual" elements, depending on a point of view. Elements can include any "real" or "virtual" object, subject, participant, or image representation. Various components of the disclosed methods and systems are illustrated in FIG. 1.

A common field of interest 101 can be a field within which elements are physically and/or virtually present. Point of Reality (or Point of View) can refer to the vantage of the element/participant that is experiencing the common field of interest. In FIG. 1, exemplary points of reality, or points of view, are shown at 102 and 103, representing displays. The common field of interest 101 can appear similar from both vantages, or points of view, but each comprises differing combinations of local (physical) and remote (virtual) elements/participants.

Local elements can be elements and/or participants which are physically present in the common field of interest. In FIG. 1, element A 105 is a local element for field A 104 and is physically present in field A 104. Element B 107 is a local element for field B 106 and is physically present in field B 106. It is understood that virtual elements (not shown) can be inserted or overlaid in field A 104 and/or field B 106, as desired.

Remote elements can be elements and/or participants that are not physically present in the common field of interest. They are experienced as "virtually present" from any other local vantage point. As shown in FIG. 1, element B 107 is a remote element to field A 104 and is virtually present in field A 104. Element A 105 is a remote element in field B 106 and is virtually present in field B 106.

Methods for rendering a virtual interactive presence by combining local and remote elements and/or participants can comprise one or more of the following steps. A common local field can be rendered in a manner that reflects the presence of the field, elements and/or participants. As shown in FIG. 2A, Participant A can experience real elements in field A through a viewer. The common local field can be rendered such that it is experienced remotely in a manner that enables remote participants to experience it similarly to the local persons. As shown in FIG. 2A, this is illustrated by Participant A experiencing element B as virtually present in field A.

Remote persons can insert themselves and/or interact with the virtual field as rendered to them. For example, Participant A can insert hands, instruments, etc. into field A and interact with the virtual element(s) B. Viewer B can view a 'virtual compliment' to this, with Viewer B's real elements interacting with Participant A's virtual elements.

The common local field can be continuously updated such that the presence of the remote participants can be rendered in real time. For example, the remote scene can be the most up-to-date available with the time lag between the remote capture and the local render kept as low as possible. Conversely, if there is a need to introduce a timing difference, this can be accomplished as well.

The common local field can be scaled to a size and depth to meaningfully match the local scene. And the common local field can be configurable, such that remote elements can be made more or less transparent, removed entirely, or otherwise altered to suit the needs of the local user.

Each field is captured by a digital camera. The resulting image is physically distorted from its reality, based upon the physical characteristics of the camera. A processor, therefore, receives and displays a "physically" distorted version of the local reality. Likewise, a digital camera also captures the remote field(s), but the incoming stream is relayed through a transmission device and across a network. The processor, therefore, receives the remote stream that contains both physical and transmission-based distortion. The processor must then apply a series of transformations that removes the physical and transmission-based distortion from the common local field.

Figure 2B:
FIG. 2B illustrates a local expert assisting a remote user.

The local participants can experience the virtually present participants in a manner that enables continuous interaction in the common local field. FIG. 2B illustrates a local expert assisting a remote user. The hands of the local expert 201 are slightly transparent and superimposed into the field that is viewed by the remote user. The remote user can view the local expert's hands, the remote user's hands and a puzzle located at the remote user's location. The local expert is assisting the remote user in assembling a puzzle.

Figure 3:
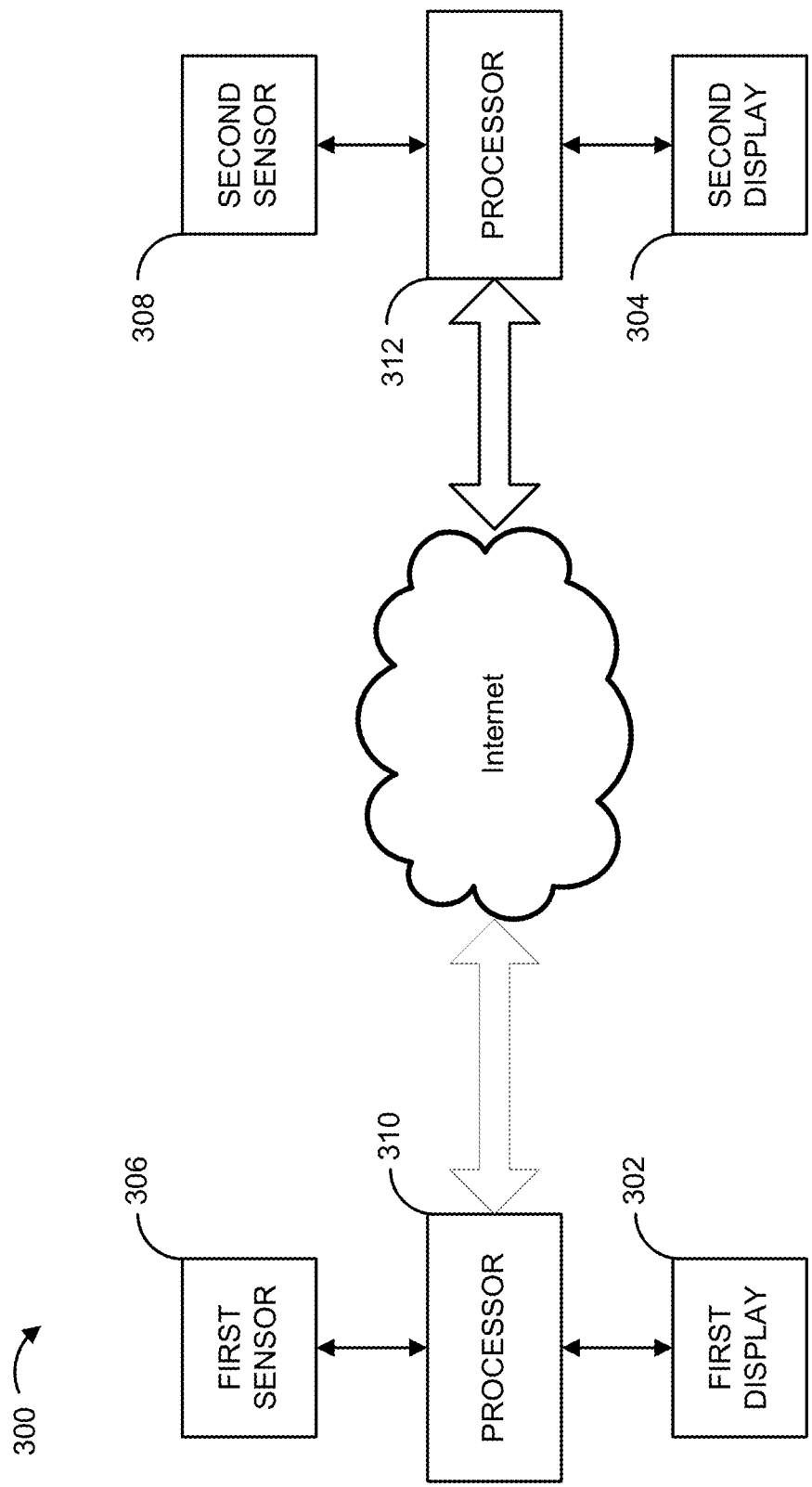
FIG. 3 illustrates an exemplary system architecture.

FIG. 3 illustrates an exemplary image processing system 300. As shown, the system 300 can comprise a first display 302 and a second display 304 configured for displaying one or more of an image, a video, a composite video/image, and a common field of interest, for example. However, it is understood that any number of displays can be included in the system 300. In certain aspects, the second display 304 can be disposed remotely from the first display 302. As an example, each of the first display 302 and the second display 304 can be configured to render the common field of interest thereon. As a further example, each of the first display 302 and the second display 304 can be configured to render at least one of the local field and the remote field thereon. In certain aspects, at least one of the first display 302 and the second display 304 can be a VIP display, as described in further detail herein. However, it is understood that each of the first display 302 and the second display 304 can be any type of display including a monoscopic display and a stereoscopic display, for example. It is understood that any number of any type of display can be used.

A first sensor 306 can be in signal communication with at least the first display 302 and can be configured for obtaining image data such as virtual presence data, for example. In certain aspects, the first sensor 306 can be one or more of a camera, an infrared sensor, a light sensor, a RADAR device, a SONAR device, a depth scan sensor, and the like. It is understood that the first sensor 306 can be any device or system capable of capturing/obtaining image data representative of at least one of a "real" element and a "virtual" element.

A second sensor 308 can be in signal communication with at least the second display 304 and can be configured for obtaining image data such as virtual presence data, for example. In certain aspects, the second sensor 308 can be one or more of a camera, an infrared sensor, a light sensor, a RADAR device, a SONAR device, a computed tomography device, a magnetic resonance imaging device, a depth scan sensor, and the like. It is understood that the second sensor 308 can be any device or system capable of capturing/obtaining image data representative of at least one of a "real" element and a "virtual" element. It is further understood that any number of sensors can be used.

A plurality of processors 310, 312 can be in direct or indirect signal communication with at least one of the first display 302, the second display 304, the first sensor 306, and the second sensor 308. Each of the processors 310, 312 can be configured to render the image data collected by the sensors 306, 308 onto at least one of the displays 302, 304.

It is understood that the processors 310, 312 can be configured to modify the image data and the resultant image for transmission and display. It is further understood that any number of processors can be used, including one. In certain aspects, the system 300 comprises the processor 310, 312 in data communication with each other.

In certain aspects, each of the displays 302, 304 can comprise an associated one of the processors 310, 312 for rendering images onto the displays 302, 304. Each of the processors 310, 312, or another system comprising a processor, can communicate with each other through a network connection. For example, remote sites can connect via the Internet or other network. Tasks can be divided amongst each of the processors 310, 312. For example, one of the processors 310, 312 can be configured as a graphics processor or graphics server and can gather images from one of the sensors 306, 308 and/or a network server, perform image composition tasks, and drive one or more of the displays 302, 304.

In an aspect, one or more of the processors 310, 312 can be configured to render an image. As an example, one or more of the processors 310, 312 can be configured to render a common field of interest that reflects a presence of a plurality of elements based upon the image data obtained by at least one of the sensors 306, 308. As a further example, at least one of the elements rendered in the common field of interest can be a remote element physically located remotely from another of the elements. The processors 310, 312 can also be configured to render/output the common field of interest to at least one of the displays 302, 304. As an example, the processors 310, 312 can render interaction between a remote user and a local user in the common field of interest. As a further example the presence of the remote element can be rendered in real time to the local user and the presence of a local element can be rendered in real time to the remote user.

In an aspect, one or more roles can be designated (e.g., defined, selected, received, generated) for one or more users. As an example, a role can be designated as an abstraction that triggers a logical execution of one or more related programs by a processor. Such programs can, as an example, trigger a modification in the arrangement, organization, and/or presentation of a graphical user interface as displayed to a user. As another example, such programs can affect the processing of images and/or video and/or audio by modifying the processing and/or post-processing of one or more images and/or video streams and/or audio streams. As a further example, these programs can affect the rendering of images, video, and/or audio presented to one or more users.

In an aspect, processing of images can be implemented via a local processor prior to transmission to a remote processor. For example, image compositing can occur at a local processor prior to transmission. As such, images and/or or video received by a remote processor do not require compositing at the remote processor and can be accepted by a codec. As a further example, role designation can be implemented as an implicit role designation that occurs when a system performs image composition versus a system that merely receives processed images. Software such as emulators, clients, applications and the like can be used to facilitate the operation of a particular role designation.

In an aspect, a helper role can comprise the manipulation of data flow and data presentation. As an example, the helper role can comprise a particular arrangement of a software pipeline, such as a series of processing elements for which the output of one processing element is the input for the successive processing element. As a further example, images captured by a local camera and processed by a local processor can be merged with images captured by one or more remote cameras and processed by one or more remote processors in a manner that is associated with the helper role.

In an aspect, a particular texture processing can be associated with the helper role. As an example, an image can be mapped to a screen according to a specified coordinate transformation, wherein inputs are given as parameters to a fragment or pixel shader. As a further example, one or more programmable functions associated with the helper role can be used to modify the traits (e.g., color, z-depth, alpha value) of one or more pixels of a given image. As another example, an image can have background subtraction, background removal, object detection, or similar algorithms applied to it for selective display of a region of the image.

In an aspect, for the helper role, one or more images captured by a local camera and processed by a local processor can be rendered with an opacity of less than one, giving them a degree of transparency. One or more images captured by a remote camera and processed by a remote processor can be rendered with an opacity of about one, thereby providing substantially complete opacity. As an example, one or more images of a remote "scene of interest" (e.g., surgery, maintenance site) can be rendered to fit a full display screen. As another example, one or more images of a remote user can be tiled or arranged on the display screen (e.g., picture-in-picture). As a further example, one or more images of a remote user's environment can be tiled or arranged on the display screen.

In an aspect, an operator role can comprise the manipulation of data flow and data presentation. As an example, the operator role can comprise a particular arrangement of a software pipeline, such as a series of processing elements for which the output of one processing element is the input for the successive processing element. As a further example, images captured by a local camera and processed by a local processor can be merged with images captured by one or more remote cameras and processed by one or more remote processors in a manner that is associated with the operator role.

In an aspect, the operator role can comprise the manipulation of one or more input hardware devices. As an example, one or more video capture cards can be enabled to capture one or more images. As another example, a local processor can write one or more images through said video capture card to a circular or ring buffer. As another example, one or more images can be written to a queue. As a further example, one or more images can be written to a stack.

In an aspect, a particular texture processing can be associated with the operator role. As an example, an image can be mapped to a screen according to a specified coordinate transformation, wherein inputs are given as parameters to a fragment or pixel shader. As a further example, one or more programmable functions associated with the operator role can be used to modify the traits (e.g., color, z-depth, alpha value) of one or more pixels of a given image. As another example, an image can have background subtraction, background removal, object detection, or similar algorithms applied to it for selective display of a region of the image.

In an aspect, for the operator role, one or more images captured by a local camera and processed by a local processor can be rendered with an opacity of about one. As an example, one or more images of a local "scene of interest" can be rendered with substantially full opacity. As a further example, one or more images captured by a local camera and processed by a local processor can be rendered with an opacity of less than one, providing a degree of transparency. One or more images captured by a remote camera and processed by a remote processor can be rendered with an opacity of less than one, thereby providing a degree of transparency. As another example, one or more images of a remote user can be tiled or arranged on the display screen (e.g., picture-in-picture). As a further example, one or more images of a remote user's environment can be tiled or arranged on the display screen.

In an aspect, a heads up role can comprise the manipulation of data flow and data presentation. As an example, the heads up role can comprise a particular arrangement of a software pipeline, such as a series of processing elements for which the output of one processing element is the input for the successive processing element. As a further example, images captured by a local camera and processed by a local processor can be merged with images captured by one or more remote cameras and processed by one or more remote processors in a manner that is associated with the heads up role.

In an aspect, the heads up role can comprise processing images captured by one or more local cameras to facilitate display alongside images captured by one or more remote cameras and processed by one or more remote processors. As an example, the local and remote images can be tiled. As another example, one or more local images can be rendered in a manner utilizing a plurality of the screen, with one or more remote images displayed in a relatively smaller window. As a further example, one or more remote images can be rendered in a manner utilizing a majority of the screen, with one or more local images displayed in a relatively smaller window. Other roles and associated processing can be used.

In an aspect, a subscriber role can comprise the manipulation of data flow and data presentation. As an example, the subscriber role can comprise a particular arrangement of a software pipeline, such as a series of processing elements for which the output of one processing element is the input for the successive processing element. As a further example, images captured by one or more remote cameras and processed by one or more remote processors can be merged and displayed to the subscriber in a manner that is associated with the subscriber role.

In an aspect, the subscriber role can comprise processing images captured by one or more remote cameras and processed by one or more remote processors. As an example, while designated as the subscriber role, a local processor can generally receive, but not send, video images. As a further example, one or more remote images can be rendered in a manner utilizing a majority of the screen. Other roles and associated processing can be used.

In an aspect, a sender role can comprise the manipulation of data flow and data presentation. As an example, the sender role can comprise a particular arrangement of a software pipeline, such as a series of processing elements for which the output of one processing element is the input for the successive processing element. As a further example, images captured by a local camera and processed by a local processor can be sent to one or more remote processors in a manner that is associated with the sender role.

In an aspect, the sender role can comprise sending images captured by one or more local cameras and processed by one or more local processors. As an example, a sender can generally send, but not receive, video images. Other roles and associated processing can be used.

In an aspect, an administrator role can comprise selectively designating which of a plurality of devices (e.g., processors) can take an active role in processing content (e.g., images, audio, etc.) captured by one or more remote cameras and which of a plurality of devices can take a passive role of receiving processed content (e.g., images, audio, etc.). As an example, the device designated in the administrator role can designate one or more devices as administrators, operators, helpers, heads up, subscriber, or senders. In an aspect, the images rendered in a common field of interest can be modified to illustrate one or more of the designated roles of the devices in communication with the common field of interest. As an example, the operator role can be shown with near zero transparency, while the helper roles can be shown with varying levels of transparency to distinguish between one or more helpers. As a further example, subscribers can be designated as an icon to illustrate that a subscriber is present, but not transmitting image data. As yet a further example, senders can be shown with a distinct characteristic (e.g., color, opacity, outline, icon, etc.) so that viewers of the common field of interest can recognize that a sender is transmitting image information, but is not receiving and/or viewing the common field.

In an aspect, an active viewer role can comprise selectively manipulating one or more aspects of a viewed common field. As an example, the device designated in the active viewer role can adjust transparency/opacity of images originating from one or more devices in one or more of a heads up, administrator, operator, helper, or sender role. As another example, the manipulations made by the device in the active viewer role would generally only affect the presentation of the common field as viewed locally, and not propagate to other devices. As a further example, active viewers can manipulate one or more non-imaging aspects of a workspace containing the common field, including presentation of meta-data, contextually relevant workspace data or information, and the like. As another example, active viewers can manipulate image data originating from outside the common field (e.g., MRI, X-ray, infrared, and the like).

In an aspect, one or more devices in one or more roles can implement additional features well known to those skilled in the art. These features include but are not limited to, text-based communication, video/audio recording, and text-based video annotation.

In an aspect, processing of images can be implemented via a local processor prior to transmission to a remote processor. For example image processing can occur at a local processor prior to transmission. As a further example, role designation can be implemented as an implicit role designation that occurs when a system performs image composition versus a system that merely receives processed images.

Figure 4A:
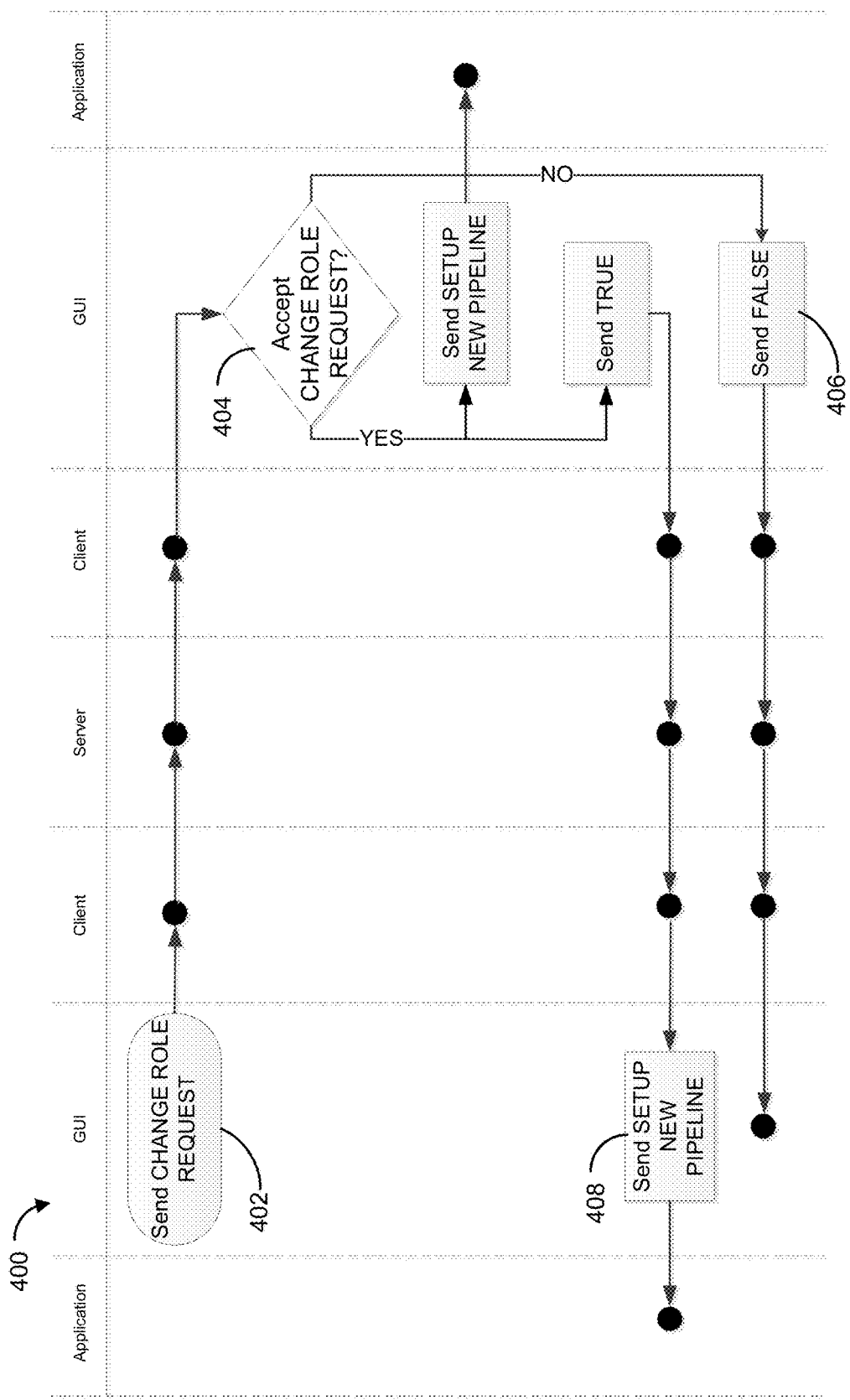
FIG. 4A illustrates an exemplary process performed by the system of FIG. 3.

FIG. 4A illustrates exemplary process 400 that can be performed with at least one of the processors 310, 312. Other processor and/or computing devices can be used to perform the process 400. In step 402, a request for a role change or role designation can be transmitted/received. In an aspect, a button push on a graphical user interface initiates an event which facilitates transmission of a "role change request" from the graphical user interface of a first application to the graphical user interface of one or more other applications. As an example, the role change request can comprise a designation or specification of the role a local user desires the local application to assume. As an example, the role change request can be a communication comprising the desired role as a string literal. As another example, the role change request could be a communication comprising the desired role as an integer mapped to a string in a table of a database.

In an aspect, triggering the transmission/receipt of a role change request can be facilitated by one or more logical or physical events. As an example, an event can be triggered via an input from a user. As further examples, an event can be triggered via gesture recognition, speech recognition, the triggering of an accelerometer, a swipe, a pinch, or a touch, or a combination thereof.

In an aspect, triggering the transmission/receipt of a role change request can be facilitated by one or more processors performing monitoring/active management of the common field. As an example, a processor could utilize machine vision and/or image processing techniques to detect image characteristics that suggest one or more users desire to take on one or more roles. As another example, a processor could detect the amount of activity (motion) in the common field, and dynamically allocate roles based on characteristics of the activity. As a further example, a processor could force role changes at particular points during a multi-reality session as defined by a pre-set or pre-defined program or role schedule.

In an aspect, the role change request can be transmitted to a local client program, which can be defined as a computer application or computer program that communicates with a server to access a service. As an example, the local client program can transmit the request to a server over a network. The local client program can transmit the request to a server running on the same computer, avoiding having to traverse a network. The server can be comprised as a computer hardware or computer software that provides access to a service for a client program. As a further example, the server can transmit the role change request to one or more client programs as specified by the request. In an aspect, each client program can transmit the request to a remote graphical user interface of a remote application.

In step 404, when the graphical user interface receives the request, one or more conditional statements (e.g., IF-THEN statements) can be executed to determine whether to accept the request. In an aspect, a sequence of conditional statements can be executed by a local processor to determine whether to accept the change role request.

In an aspect, the local processor can perform a check to determine whether a role corresponding to the role specified in the change role request can be located and/or generated. As an example, if no corresponding role is located, a negative (i.e., FALSE) response can be transmitted to a local client, at step 406. As an example, the local client can transmit the response to a computing device. The computing device can transmit the response to one or more remote clients. The remote clients can present the response to corresponding graphical user interfaces. As a further example, if a corresponding role is located, the role (and the associated functionality) can be used to control the presentation of images via one or more displays. In an aspect, an identifier such as a character or string can be used to identify one or more roles, at step 408. As an example, the identifier can be used to associate particular processing paths and/or presentation configurations with one or more role designations. Accordingly, role designations can be selected, processed, located, manipulated, and the like based upon the identifier associated therewith.

In an aspect, a processor can perform a validation check to determine whether the local application is already in the corresponding role. If true, the processor can initiate the sending of an affirmative response (i.e., TRUE) from the local graphical user interface of the local application to the remote graphical user interface of one or more remote applications. If the corresponding role is not equal to the local application's current role, the current role of the local application can be reassigned or designated to the corresponding role. As such, the arrangement, organization, and/or presentation of a graphical user interface as displayed to one or more users can be modified. As an example, a software pipeline associated with the designated role can be configured.

In an aspect, pseudocode for updating a current role presented via an interface can comprise:

```
IF (corresponding_role_found)
    role ← corresponding_role
    IF (role = current_role)
        SEND true
    ELSE
        current_role ← role
        SEND true
    ENDIF
ELSE
    SEND false
ENDIF
```

Figure 4B:
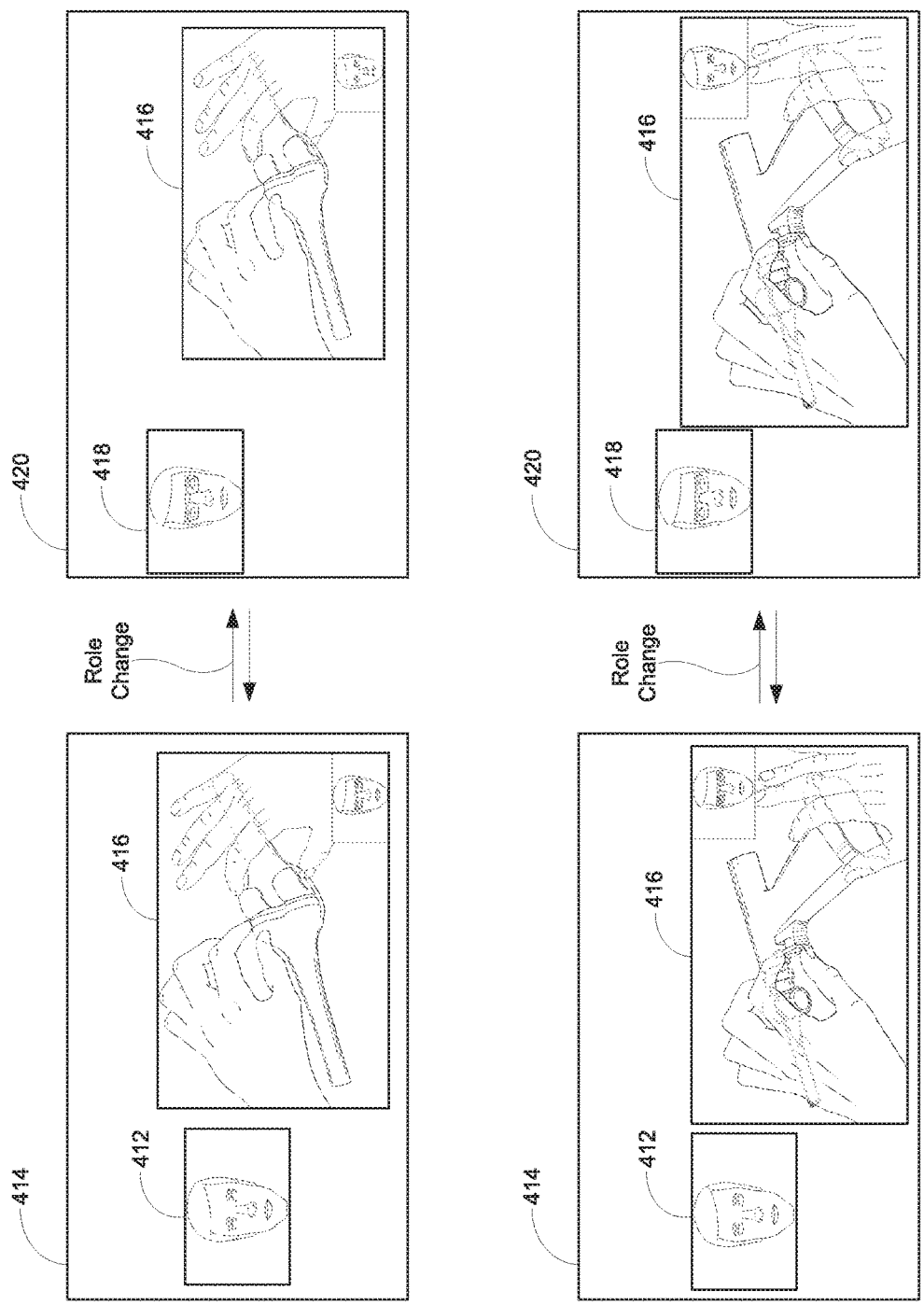
FIG. 4B illustrates an exemplary virtual interactive presence schematic.

FIG. 4B illustrates an exemplary schematic of a multi-reality session. In an aspect, a first user 412 at a first location 414 having a field of interest 416 can be in communication with a second user 418 at a second location 420. As an example, the first user 412 can be in the operator role, while the second user 418 can be in the helper role. As such, the field of interest 416 can be shared between the first user 412 and the second user 418. As a further example, the field of interest 416 can be configured to present images in a first configuration associated with the first user 412 designated as the operator role. Following a role change, the first user 412 can assume the helper role, while the second user 418 can assume the operator role. As such, the field of interest 416 can be shared between the first user 412 and the second user 418 and can be updated to present images in a second configuration based on the second user 418 designated as the operator role.

In an aspect, processing of images can be implemented via a local processor prior to transmission to a remote processor. For example image compositing can occur at a local processor prior to transmission. As such, images and/or or video received by a remote processor does not require compositing and can be accepted by a codec. As a further example, role designation can be implemented as an implicit role designation that occurs when a system performs image composition versus a system that merely receives processed images.

FIG. 4C illustrates an exemplary rendering of the field of interest 416 configured to illustrate the first user 412 designated in the operator role. In an aspect, FIG. 4C illustrates the field of interest 416 from the perspective of the first user 412. In another aspect, one or more video capture cards can be enabled to capture one or more images of a local field of interest (e.g., prosthetic knee). The images of the field of interest 416 can be rendered with an opacity of substantially one. Images of a hand 420 of the first user 412 and a hand 422 of the second user 418 can be rendered with an opacity of less than one, while images of a face 424 of the second user 418 can be tiled or arranged on the display with an opacity of substantially one.

Figure 4D:
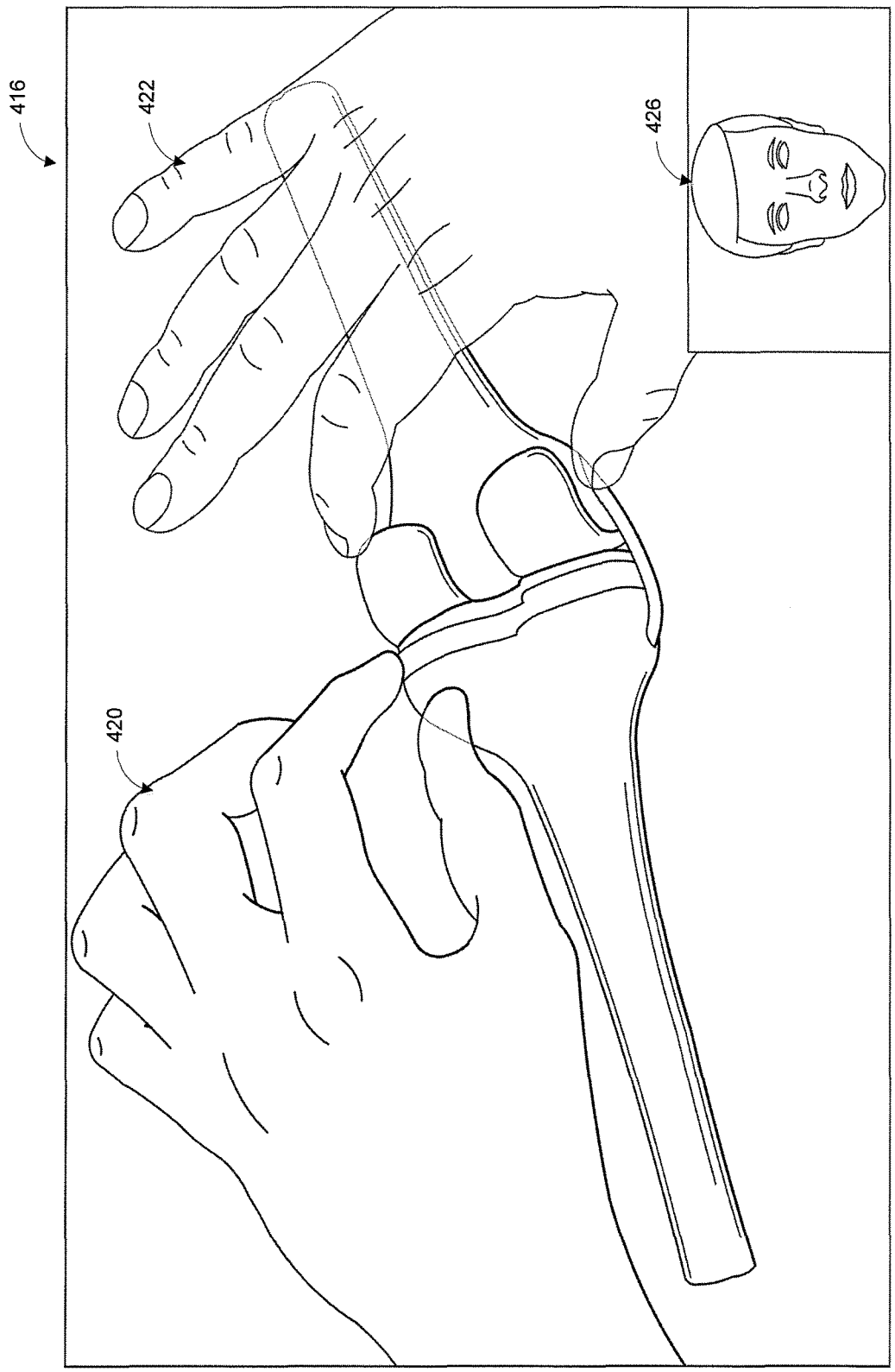
FIG. 4D illustrates an exemplary user interface.

FIG. 4D illustrates an exemplary rendering of the field of interest 416 configured to illustrate the second user 418 designated in the helper role. In an aspect, FIG. 4D illustrates the field of interest 416 from the perspective of the second user 418. The images of the field of interest 416 can be rendered with an opacity of substantially one. Images of the hand 420 of the first user 412 and the hand 422 of the second user 418 can be rendered with an opacity of less than one, while images of the face 426 of the first user 412 can be tiled or arranged on the display with an opacity of substantially one.

In an aspect, a selection of a graphical button rendered on a touch-sensitive display can be used to initiate a role change request. As an example, the graphical button push can initiate the transmission of a role change request from a graphical user interface rendered by a first processor to a graphical user interface rendered by a second processor. As a further example, the graphical button can specify a role that the second user desires to assume.

Figure 4E:
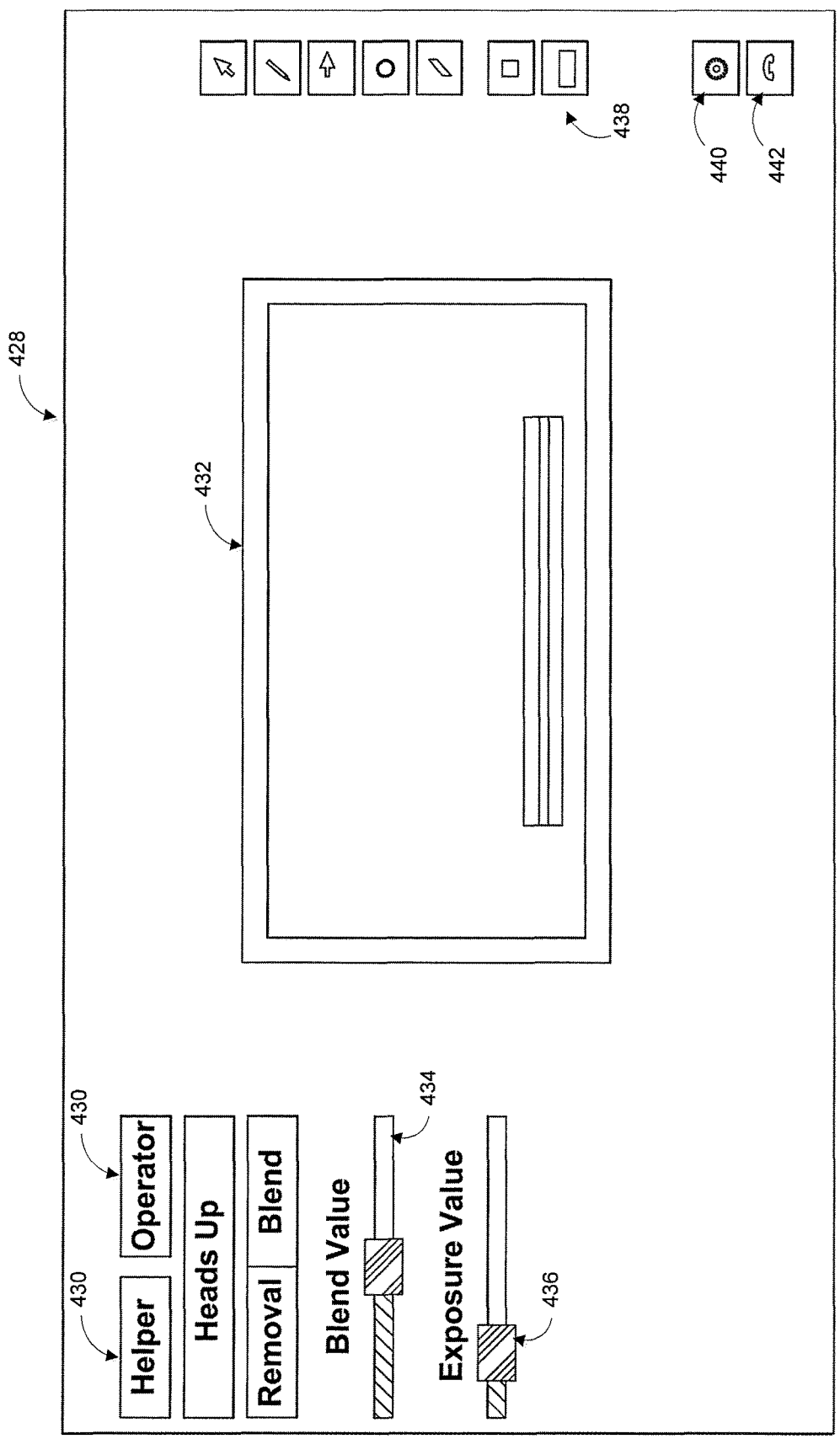
FIG. 4E illustrates an exemplary user interface.

In an aspect, FIG. 4E illustrates an exemplary rendering of a graphical user interface 428 to one or more users. One or more graphical buttons 430 can allow a user to make a role designation such as "Operator," "Helper," and/or "Heads Up." A video window 432 can display one or more images. Additional options may be exposed to the user, which can allow further manipulation of the video image in a multi-reality session. As an example, a graphical "blend value" slider 434 can allow a user to determine the relative proportions of real and virtual images viewed. As another example, a graphical "exposure value" slider 436 can allow a user to modulate the exposure properties of a local or remote camera. As a further example, a graphical "telestration" menu 438 can allow a user to perform virtual drawings on top of a video image. A graphical "preferences" button 440 and graphical "end session" button 442 can allow a user to modulate other session parameters and end the current session with a remote user, respectively.

FIG. 4F illustrates an exemplary rendering of the field of interest 416 configured to illustrate the second user 418 designated in the operator role. In an aspect, FIG. 4F illustrates the field of interest 416 from the perspective of the second user 418. In another aspect, one or more video capture cards can be enabled to capture one or more images of a local field of interest (e.g., prosthetic knee). The images of the field of interest 416 can be rendered with an opacity of substantially one. Images of the hand 420 of the first user 412 and the hand 422 of the second user 418 can be rendered with an opacity of less than one, while images of the face 426 of the first user 412 can be tiled or arranged on the display with an opacity of substantially one.

Figure 4G:
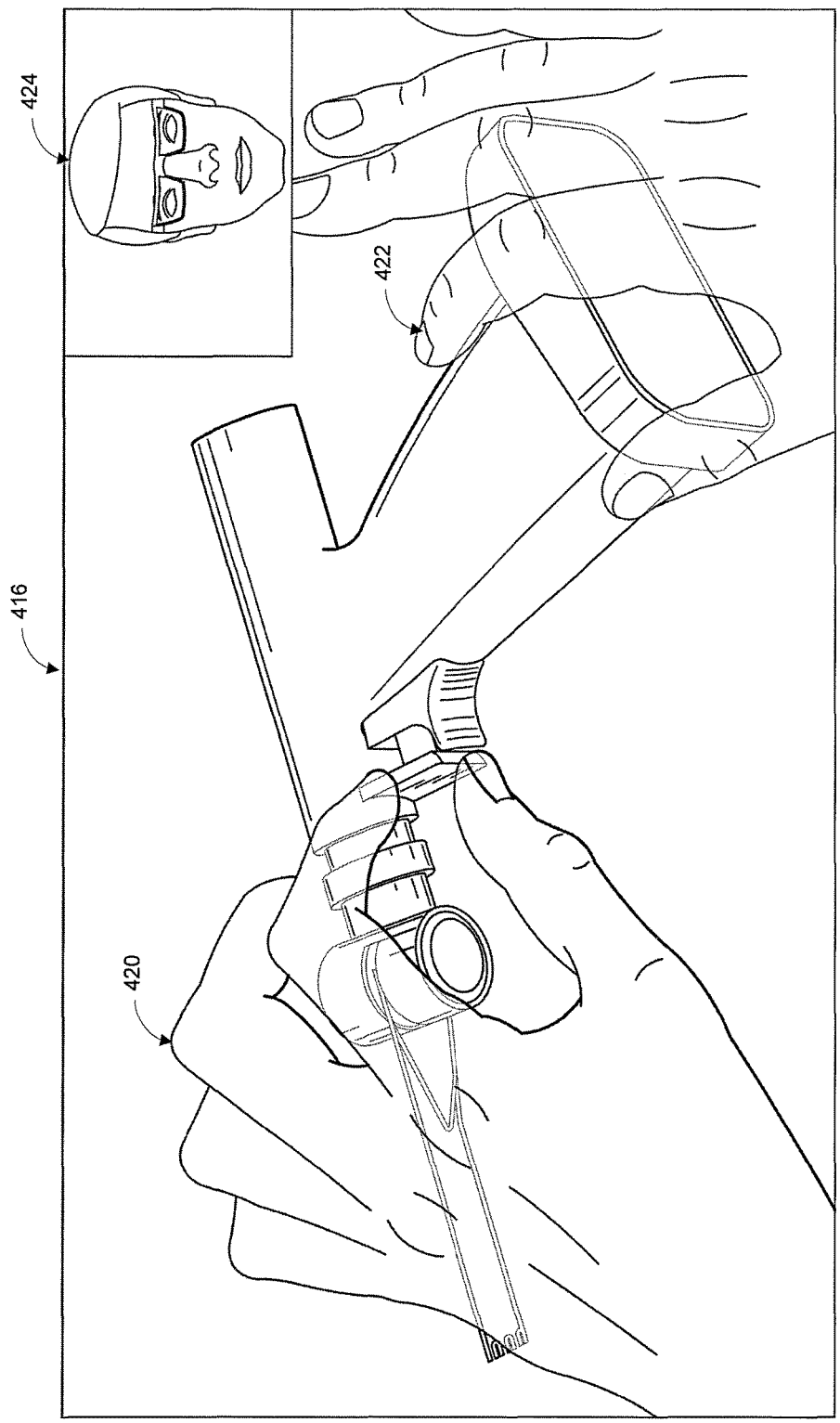
FIG. 4G illustrates an exemplary user interface.

FIG. 4G illustrates an exemplary rendering of the field of interest 416 configured to illustrate the first user 412 designated in the helper role. In an aspect, FIG. 4G illustrates the field of interest 416 from the perspective of the first user 412. The images of the field of interest 416 can be rendered with an opacity of substantially one. Images of the hand 420 of the first user 412 and the hand 422 of the second user 418 can be rendered with an opacity of less than one, while images of the face 424 of the second user 418 can be tiled or arranged on the display with an opacity of substantially one.

In an aspect, a role (and the associated functionality) can be used to control the presentation of images via one or more displays. In an aspect, an identifier such as a character or string can be used to identify one or more roles. As an example, the identifier can be used to associate particular processing paths and/or presentation configurations with one or more role designations. As such, the arrangement, organization, and/or presentation of a graphical user interface as displayed to one or more users can be modified. As an example, a software pipeline associated with the designated role can be configured.

Figure 5A:
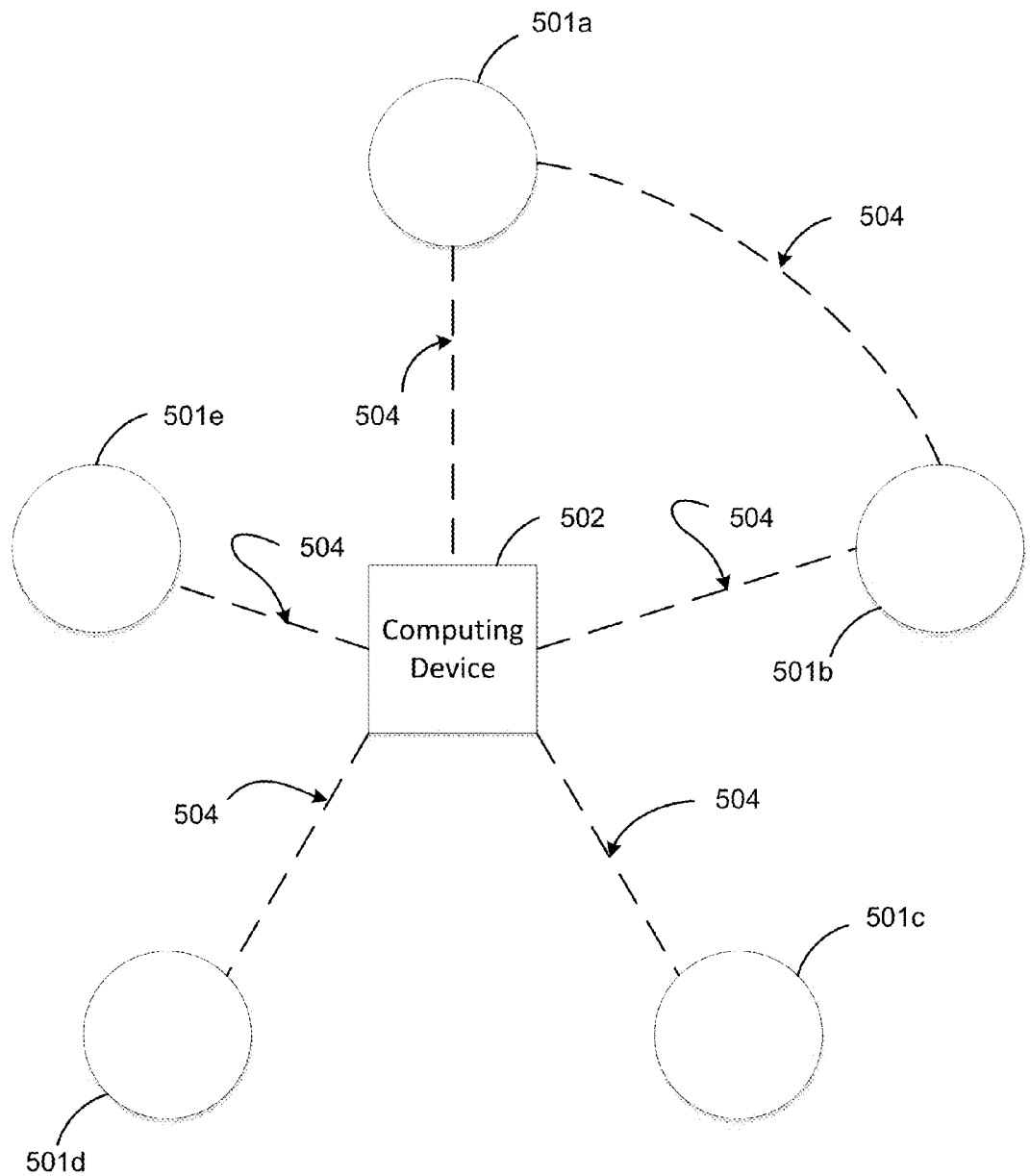
FIG. 5A illustrates an exemplary system architecture.

In an aspect, the methods disclosed herein can be implemented via one or more system architectures. As shown in FIG. 5A, the architecture can include, but are not limited to, one or more user devices 501*a*, 501*b*, 501*c*, 501*d*, 501*e*, a computing device 502 (e.g., a central server) and communication links 504 (e.g., connections) between one or more of the user devices and/or a user device and the computing device 502. In an aspect, the user devices 501*a*, 501*b*, 501*c*, 501*d*, 501*e* can transmit and/or receive one or more images to/from other ones of the user devices 501*a*, 501*b*, 501*c*, 501*d*, 501*e* as part of a multi-reality environment process.

In an aspect, one or more of the user devices 501*a*, 501*b*, 501*c*, 501*d*, 501*e* can capture/process images from a local camera/processor. As an example, these images could then be merged with one or more images captured/processed by a remote camera/processor. In some aspects, it is desirable to modify certain parameters such as latency or bandwidth in order to promote a higher quality user experience for user devices in specified roles. Thus, the general purpose architecture illustrated in FIG. 5A can be modified in order to achieve these ends. As an example, the architecture can utilize additional processing paths (e.g., communication links 504) and/or computing devices (e.g., computing device 502) to reduce bandwidth requirements for and/or latency experienced by one or more user devices (e.g., user devices 501*a*, 501*b*, 501*c*, 501*d*, 501*e*). As a further example, the architecture can be modified to offload processing requirements from one or more user devices.

In an aspect, one or more roles can be designated (e.g., defined, selected, received, generated) for one or more user devices 501*a*, 501*b*, 501*c*, 501*d*, 501*e*. As an example a role can be designated as an abstraction that triggers a logical execution of one or more related programs by a processor associated with one or more user devices 501*a*, 501*b*, 501*c*, 501*d*, 501*e*. Such programs can, as an example, trigger a modification in the arrangement, organization, and/or presentation of a graphical user interface as displayed to a user. As another example, such programs can affect the processing of images and/or video by modifying the processing and/or post-processing of one or more images. As a further example, these programs can affect the rendering of images or video presented to one or more users.

In an aspect, processing of images can be implemented locally to one of the user devices 501*a*, 501*b*, 501*c*, 501*d*, 501*e* prior to transmission to a remote processor (e.g., another user devices 501*a*, 501*b*, 501*c*, 501*d*, 501*e* or computing device 502). For example, image compositing can occur at a local processor prior to transmission. As such, images and/or or video received by a remote processor does not require compositing and can be accepted by a codec. As a further example, role designation can be implemented as an implicit role designation that occurs when a system performs image composition versus a system that merely receives processed images.

In an aspect, a user (e.g., user devices 501*a*, 501*b*, 501*c*, 501*d*, 501*e*) can request to assume an active role such as the operator or helper by initiating a role change request. As an example, a button push on a graphical user interface can initiate an event which facilitates the transmission of a role change request from the graphical user interface of a first application to a central server (e.g., computing device 502). As a further example, the role change request can comprise a designation or specification of the role a local user desires the local application to assume. As an example, the role change request can be a communication comprising the desired role as a string literal. As another example, the role change request could be a communication comprising the desired role as an integer mapped to a string in a table of a database.

In an aspect, triggering the transmission/receipt of a role change request can be facilitated by one or more logical or physical events. As an example, an event can be triggered via an input from a user. As further examples, an event can be triggered via gesture recognition, speech recognition, the triggering of an accelerometer, a swipe, a pinch, or a touch, or a combination thereof.

In an aspect, a role change request can be transmitted from a graphical user interface to a local client program, which can be defined as a computer application or computer program that communicates with a server to access a service. As an example, the local client program can transmit the request to a server over a network. The local client program can transmit the request to a server running on the same computer, avoiding having to traverse a network. The server can be comprised as a computer hardware or computer software that provides access to a service for a client program. Once the request is received by the server, the server can perform a role change check to determine whether the role change request can be accepted. In an aspect, the server can transmit the results of the role change check to one or more remote client programs. In an aspect, each remote client program can transmit the request to an associated graphical user interface of an application.

Figure 5B:
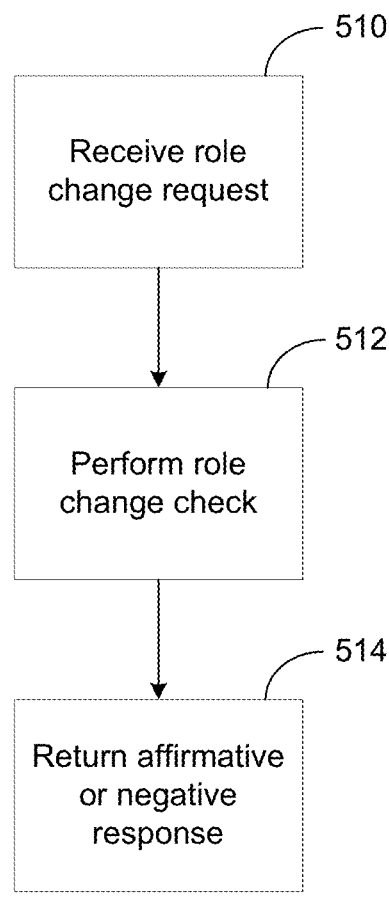
FIG. 5B illustrates an exemplary method.

FIG. 5B illustrates an exemplary method of negotiating roles. In step 510, a computing device (e.g., computing device 502 (FIG. 5B)) can receive a role change request. Upon receipt of the request, one or more conditional statements (e.g., IF-THEN statements) can be executed to determine whether to accept the request, at step 512. In an aspect, a sequence of conditional statements can be executed by the computing device to determine whether to accept the change role request.

In an aspect, the computing device can perform a role change check to determine whether a role corresponding to the role specified in the change role request can be located and/or generated. The computing device can then return an affirmative or negative response, at step 514. As an example, if no corresponding role is located, a negative (i.e., FALSE) response can be returned. As a further example, if a corresponding role is located, the processor can perform an additional check to determine whether a current user participating in the session holds the role specified by the role change request. In an aspect, if no user is located who holds the requested role, an affirmative response can be returned. In another aspect, if a user is located who holds the requested role, another check can be executed to determine whether the located user has specified a "hold" forbidding role change operations. As an example, if no hold exists, the computing device can return an affirmative (i.e., TRUE) response. As another example, if a hold does exist on the role, the computing device can return a negative response.

In an aspect, pseudocode for updating a current role presented via an interface can comprise:

```
IF (corresponding_role_found)
    role ← corresponding_role
    IF (role IN taken_roles)
        IF (current_user_with_role_has_hold)
            RETURN false
        ELSE
            RETURN true
        ENDIF
    ELSE
        RETURN true
    ENDIF
ELSE
    RETURN false
ENDIF
```

In an aspect, the value returned (e.g., an affirmative or negative response) in step 514 can trigger a series of logical events executed by one or more devices. As an example, if a negative response is returned, the computing device can send a "denied" message to a remote client (e.g., user devices 501a, 501b, 501c, 501d, 501e requesting the role change). A remote client (e.g., user devices 501a, 501b, 501c, 501d, 501e) can then transmit this message to an associated graphical user interface of an application. In an aspect, the "denied" message can instruct a graphical user interface to "do nothing" and thus maintain its current state.

Figure 5C:
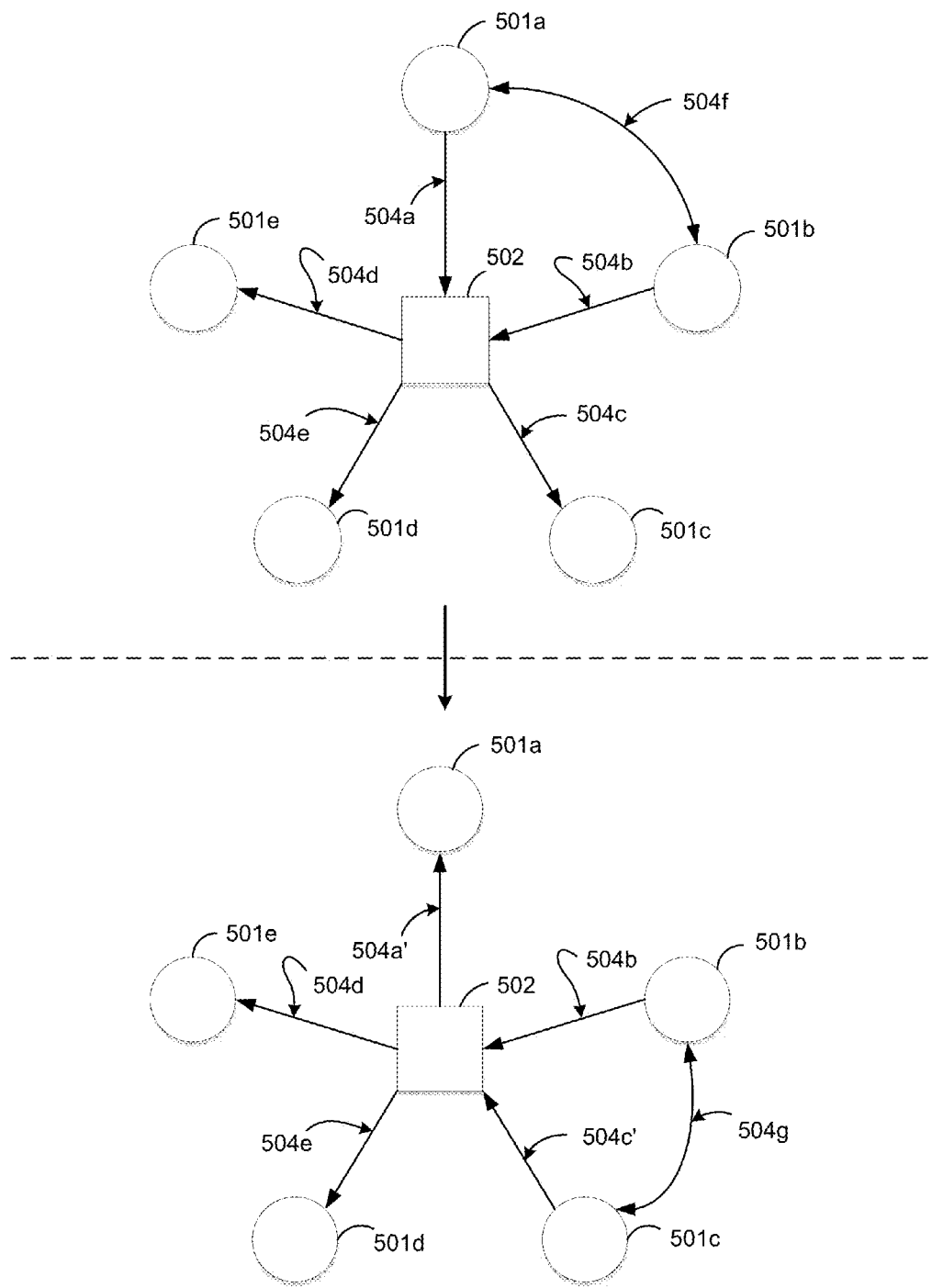
FIG. 5C illustrates an exemplary system architecture.

FIG. 5C illustrates an exemplary negotiation of a role change request. In an aspect, user device 501a can be designated as a helper role and a user device 501b can be designated as an operator role. User devices 501c, 501d, 501e can be designated as a subscriber role. Communication links 504a, 504b can be established with a computing device 502 allowing, for example, unidirectional transmission (e.g., operating under a unidirectional transmission rule governing the transmission of one or more images, a video stream, or the like) in the direction of the computing device 502. Communication links 504c, 504d, 504e can be established with the computing device 502 allowing, for example, unidirectional transmission in the direction of user devices 501c, 501e, 501d, respectively. Communication link 504f can be established between the user device 501a and the user device 501b allowing, for example, multi-directional transmission of data such as one or more images in a video stream (e.g., operating under a multi-directional transmission rule governing the transmission of one or more images, a video stream, or the like).

In an aspect, user device 501c can initiate a role change request. If the requested role (e.g., helper) is identified as already being taken by a second user device such as user device 501a in the session, a check can be executed by a computing device 502 to determine whether the graphical user interface associated with the user device 501a has specified a hold forbidding role change operations. If no hold exists, a change to subscriber message can be sent by the computing device 502 to a remote client associated with the user device 501a. As a further example, the client can then transmit this message to an associated local graphical user interface. The user device 501a can then be designated as a subscriber role. As an example, the computing device 502 can modify the communication links 504a and establish a modified communication links 504a' allowing, for example, a unidirectional transmission of data in the direction of user device 501a. As an example, the graphical user interface associated with the user device 501a can then send a message to a local application instructing it to terminate the sending of one or more images in a specified video stream to a remote application associated with user device 501b designed as e.g., operator.

In an aspect, if an affirmative response is returned in step 514 (FIG. 5B), computing device 502 can send an accept message to the associated client of user device 501c requesting a role change to a specified role (e.g., helper). The associated client of user device 501c can then transmit this message to a local graphical user interface. The user device 501c can then be designated as a requested role (e.g., helper). As an example, the computing device 502 can modify communication link 504c and establish a modified communication link 504c' allowing the, as an example, unidirectional transmission of data in the direction of computing device 502. The local graphical user interface associated with the user device 501c can then send a start send message to a local application, which can then initiate the sending of one or more images in a specified video stream to the computing device 502. Communication link 504f can be removed and communication link 504g can be established between the user device 501c and the user device 501b allowing, for example, multi-directional, transmission of data such as one or more images in a video stream. The local graphical user interface associated with the user device 501c can then send a start send message to a local application, which can then initiate the sending of one or more images in a specified video stream to user device 501b designated as e.g., operator. As an example, the user device 501c, user device 501b, and computing device 502 can then optionally perform a spatial image registration process.

In another aspect, user device 501c can initiate a role change request. If the requested role (e.g., helper) is identified as not already being taken by another user device in the session, an affirmative value can be return by the computing device 502. As an example, the computing device 502 can send an accepted message to a client associated with the user device 501c requesting a role change to a specified role. As a further example, the client can then transmit this message to an associated local graphical user interface. The user device 501c is now designated as being in the requested role (e.g., helper). The computing device 502 can establish a communication link allowing the, as an example, unidirectional in the direction of the computing device 502, transmission of, for example, one or more images in a video stream from the user device 501c. As an example, the graphical user interface associated with the user device 501c can then send a "start send" message to an associated local application, instructing it to initiate the sending of one or more images in a video stream to computing device 502. As a further example, a communication link can be established between the user device 501c and the other of the user device designated as e.g., operator or helper (if present) allowing, for example, multi-directional transmission of data such as one or more images in a video stream between the user devices 501c and the other of the user device designated as e.g., operator or helper (if present). The local graphical user interface associated with the user device 501c can then send a "start send" message to an associated local application, which can then initiate the sending of one or more images in a specified video stream to the other of the user device designated as e.g., operator or helper (if present). As an example, the user device 501c, computing device 502, and one or more other user devices in for example, the other of the helper or operator role, can then optionally perform a spatial image registration process.

Figure 5D:
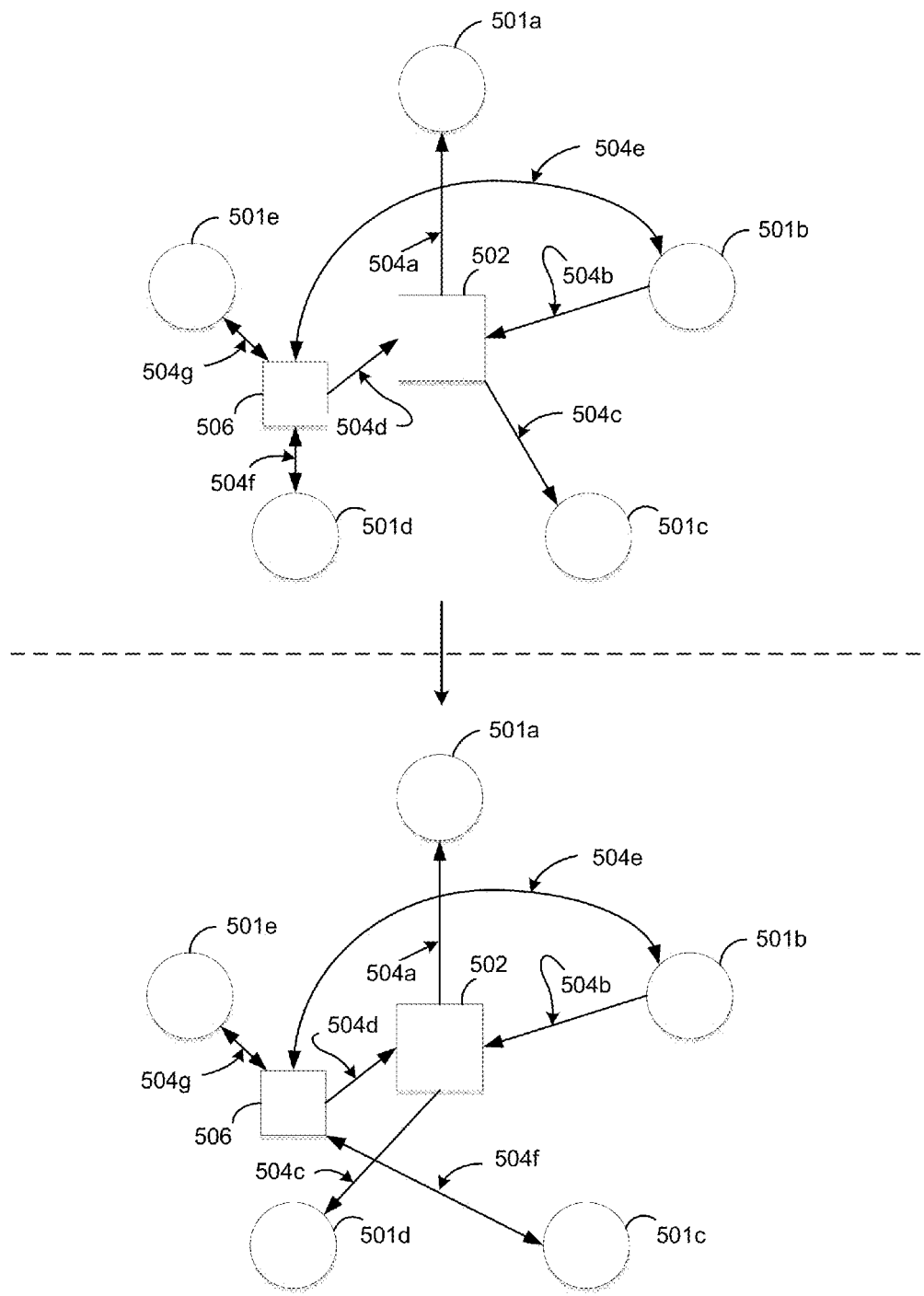
FIG. 5D illustrates an exemplary system architecture.

FIG. 5D illustrates an exemplary negotiation of a role change request. In an aspect, an intermediary device or proxy server 506 can perform processing, thereby offloading processing requirements from computing device 502 and decreasing latency experienced by one or more users. As an example, the presence of a proxy server 506 can accommodate one or more users in e.g., a helper role. In an exemplary case, as shown in FIG. 5D, user devices 501d, 501e can be designated as being in a helper role and user device 501b can be designated as being in an operator role. User devices 501a, 501c can be designated as being in a subscriber role. The proxy server 506 can perform some degree of image processing, combining one or elements from one or more images received from user devices 501d, 501e. Communication links 504d, 504b can be established with the computing device 502, allowing the, as an example, unidirectional in the direction of the computing device 502, transmission of, for example, one or more images in a video stream. Communication links 504a, 504c can be established with the computing device 502 allowing the, as an example, unidirectional in the direction of user devices 501a, 501c, respectively, transmission of, for example, one or more images in a video stream. Communication link 504e can be established between the user device 501b and the proxy server 506 allowing the, as an example, multi-directional, transmission of, for example, one or more images in a video stream. Communication links 504f, 504g can be established with a proxy server 506, allowing the, as an example, multi-directional transmission of, for example, one or more images in a video stream.

In another aspect, user device 501c can initiate a role change request. If the requested role (e.g., helper) is identified as already being taken by user device 501d in the session, a check can be executed by a computing device 502 processor to determine whether the graphical user interface associated with the user device 501d has specified a "hold" forbidding role change operations. If no hold exists, a "change to subscriber" message can be sent by the computing device 502 to a remote client associated with the user device 501d. As a further example, the client can then transmit this message to an associated local graphical user interface. The user device 501d is now designated as being in the subscriber role. As an example, the computing device 502 can establish communication link 504c with the user device 501d allowing the, as an example, unidirectional in the direction of user device 501d, transmission of, for example, one or more images in a video stream. As another example, the graphical user interface associated with the user device 501d can then send a message to the local application associated with the second user to terminate the sending of one or more video images to an application associated with a proxy server 506. As an example, the computing device 502 can send a "stop send" message to the proxy server 506 instructing it to terminate the sending of one or more video images to an application associated with the user device 501d.

In an aspect, a computing device 502 can send an "accepted" message to the associated client of user device 501c requesting a role change to a specified role (e.g., helper). The associated client of user device 501c can then transmit this message to a local graphical user interface. The user device 501c is now designated as being in the requested role (e.g., helper). The computing device 502 can then send an "establish connection" message to the proxy server 506 instructing it to establish a communication link 504f with the user device 501c allowing the, as an example, multi-directional, transmission of, for example, one or more images in a video stream. As an example, the computing device 502 can send a "start send" message to the user device 501c, instructing it to initiate the sending of one or more images in a video stream to the proxy server 506. The proxy server 506 can perform some degree of image processing, combining one or elements from one or more images received from user devices 501c, 501e. As another example, the computing device 502 can send a "start send" message to the proxy server 506, instructing it to initiate the sending of one or more images in a video stream to the user device 501c newly designated as helper. The proxy server 506 can initiate the sending of one or more images in a video stream to one or more of the user device 501e, 501c. As an example, the proxy server 506, computing device 502, and user 501b designated as e.g., operator can then optionally perform a spatial image registration process.

Figure 5E:
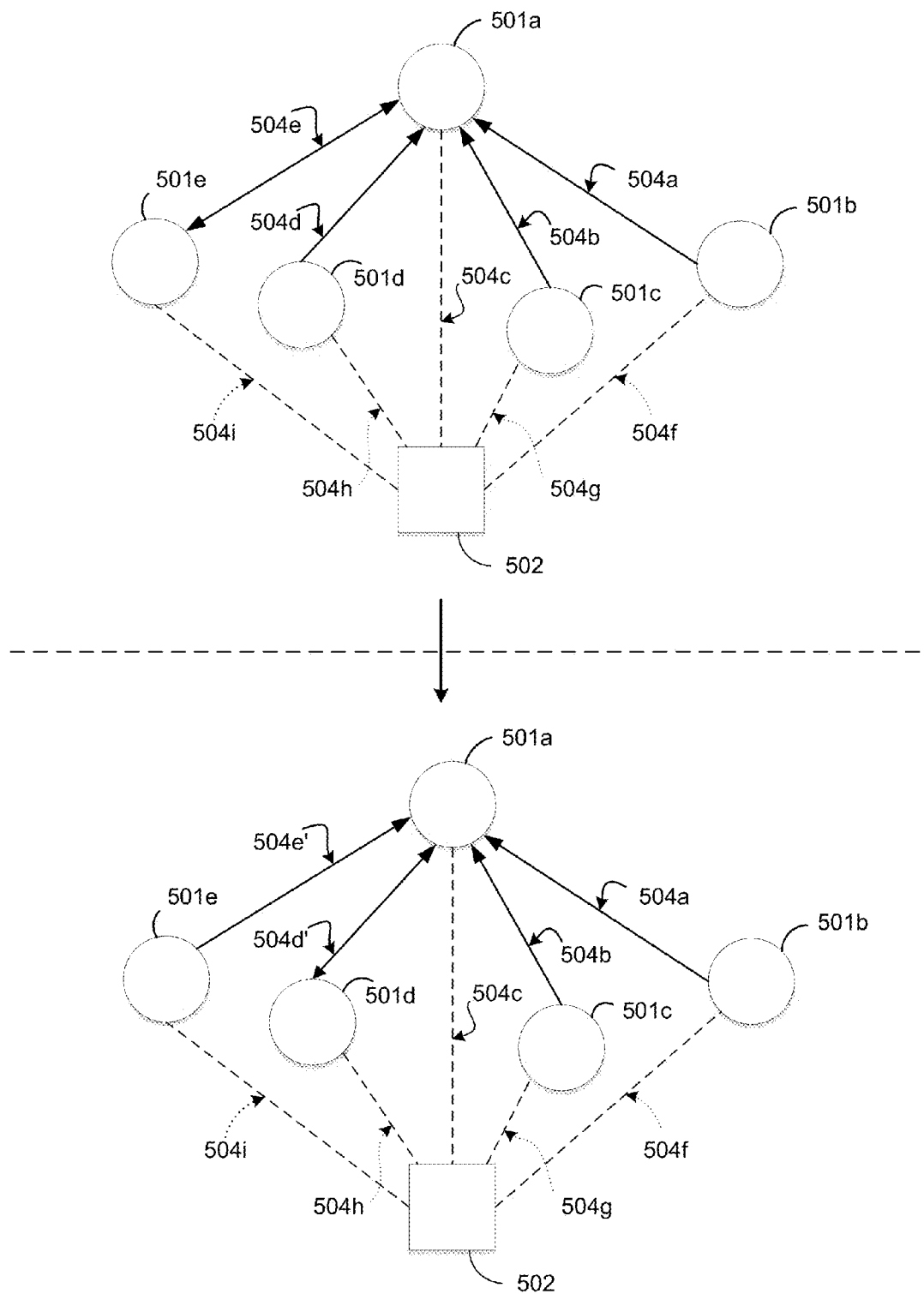
FIG. 5E illustrates an exemplary system architecture.

FIG. 5E illustrates an exemplary negotiation of a role change request. User device 501a can be designated as being in a helper role and user device 501e can be designated as being in an operator role. Communication link 504e can be established between user device 501a designated as helper and user device 501e designated as operator, allowing, as an example, multi-direction transmission of, for example, one or more images in a video stream. User devices 501d, 501c, 501b can be designated as being in a sender role. Communication links 504d, 504b, 504a can be established with user device 501a designated in a helper role, allowing, as an example, unidirectional in the direction of user device 501a, transmission of, for example, one or more images in a video stream. Communication links 504i, 504h, 504c, 504g, 504f can be established between user devices 501e, 501d, 501a, 501c, 501b, respectively, and a computing device 502, allowing multidirectional message-based communication.

User device 501d can initiate a role change request. If the requested role (e.g., operator) is identified as already being taken by user device 501e in the session, a check can be executed by a computing device 502 processor to determine whether the graphical user interface associated with the user device 501e has specified a "hold" forbidding role change operations. If no hold exists, a "change to sender" message can be sent by the computing device 502 to a remote client associated with the user device 501e. As a further example, the client can then transmit this message to an associated local graphical user interface. The user device 501e is now designated as being in the sender role. As an example, the computing device 502 can send a "modify connection" message to a remote client associated with user device 501a. The client can then transmit this message to an associated local graphical user interface. The graphical user interface associated with the user device 501a can then modify the communication link 504e to establish a modified communication link 504e' allowing the, as an example, unidirectional in the direction of the user device 501a, transmission of, for example, one or more images in a video stream from the user device 501e. As a further example, the graphical user interface associated with the user device 501a can modify the communication link 504d to establish modified communication link 504d' allowing, as an example, the multi-directional transmission of, for example, one or more images in a video stream between the user devices 501a, 501d.

In an aspect, the graphical user interface associated with the user device 501a can send a "stop send" message to an associated local application, instructing it to terminate the sending of one or more images in a video stream to the user device 501e. The computing device 502 can then send an "accepted" message to the remote client associated with the user device 501d, allowing the user that the role change request to a specified role (e.g., operator) has been accepted. The remote client can then transmit this message to an associated local graphical user interface. The user device 501d can now be designated as being in the operator role. Concurrently, the graphical user interface associated with the user device 501a can send a "start send" message to an associated local application, instructing it to initiate the sending of one more images in a video stream to user device 501d. As an example, the user device 501d and user device 501a can optionally perform a spatial image registration process.

Figure 6A:
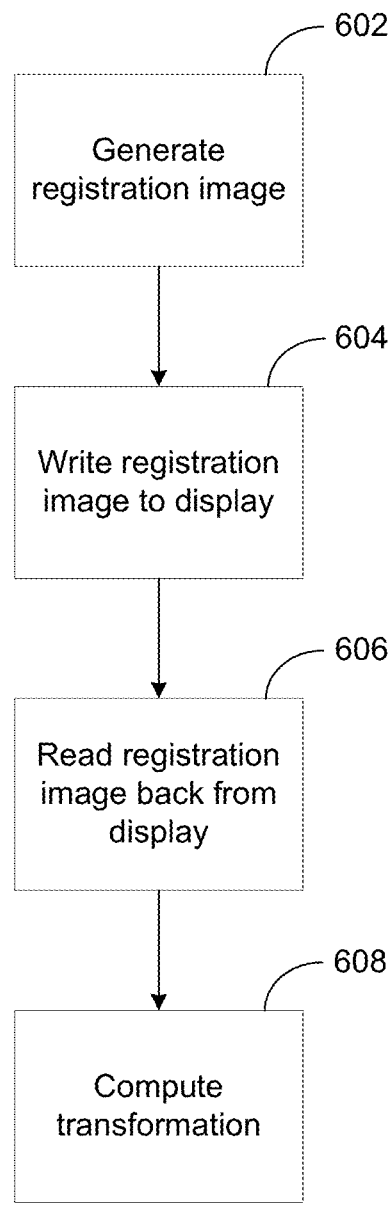
FIG. 6A illustrates an exemplary method.

FIG. 6A illustrates an exemplary spatial image registration process. In step 602, a computing device can generate a registration image consisting of a known registration pattern. As an example, this pattern can comprise dots, squares, or other shapes. In step 604, the computing device can write the locally generated registration image to a display. In step 606, the computing device can read the registration image back from the display, and compute a first mathematical transformation, at 608, between the image generated at step 602 and the image as read back at step 606. As an example, the computing device can receive a registration image from the application associated with the user designated as helper. The computing device can write the registration image to a display and subsequently read it back. The computing device can then compute a second transformation between the read-back image and the image as originally received from the application of the helper. As a further example, the computing device can additionally receive a registration image from the application of the user designed as operator. The computing device can write the registration image to a display and subsequently read it back. The computing device can then compute a third transformation between the read-back image and the image as originally received from the application of the operator. One or more of the first, second, and third transformations can then be utilized by the computing device to bring one or more images of the images generated or received from one or more of the local processor, user designated as "operator", and user designated as "helper" into the same 2-dimensional (2D) space, allowing proper spatial relationships to be maintained.

Figure 6B:
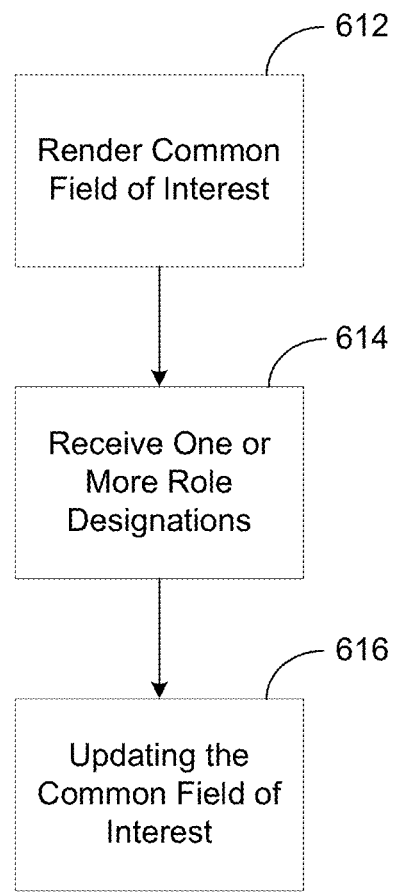
FIG. 6B illustrates an exemplary method.

FIG. 6B illustrates an exemplary role negotiation process. In step 612, a common field of interest can be rendered that reflects a presence of a plurality of elements. In an aspect, at least one of the elements is a remote element located remotely from another of the elements. In step 614, one or more role designations can be received. In an aspect, each role designation can be associated with one of a plurality of devices. As an example, at least one of the plurality of devices is a remote device located remotely from another of the plurality of devices. In step 616, the common field of interest can be updated based upon the received one or more role designations. Each of the one or more role designations can define an interactive functionality associated with the respective device of the plurality of devices. Interactive functionality can comprise one or more of sending and receiving image data. One or more of the role designations can define a different interactive functionality compared to another of the role designations.

Figure 6C:
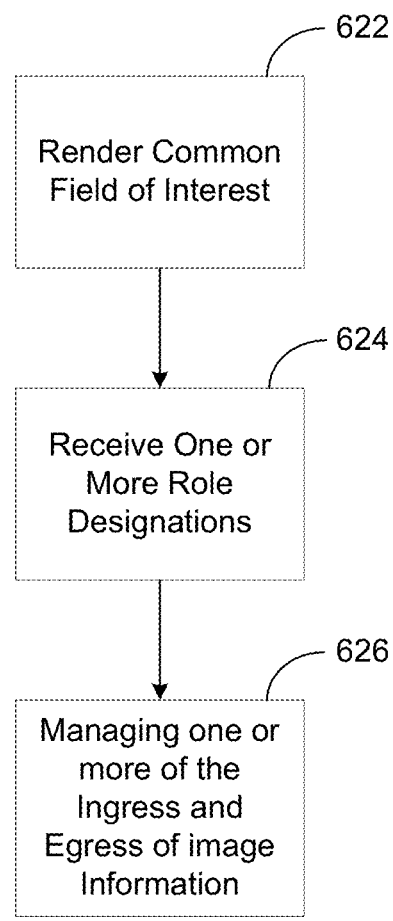
FIG. 6C illustrates an exemplary method.

FIG. 6C illustrates an exemplary role negotiation process. In step 622, a common field of interest can be rendered that reflects a presence of a plurality of elements. In an aspect, at least one of the elements is a remote element located remotely from another of the elements. In step 624, one or more role designations can be received. In an aspect, each role designation can be associated with one of a plurality of devices. As an example, at least one of the plurality of devices is a remote device located remotely from another of the plurality of devices. In step 626, one or more of an ingress and egress of information (e.g., image information, audio information, etc.) to/from one or more of the plurality of devices can be managed based upon one or more of the plurality of role designations. In an aspect, each of the role designations can define a transmission rule for managing ingress and egress of image information associated with the respective device of the plurality of devices.

In an aspect, the operator role can define (e.g., be associated with, cause to be invoked, implement, etc.) a transmission rule comprising one or more aspects for managing ingress and egress of image and audio information associated with a respective device of a plurality of devices. A device in the operator role can perform peer-to-peer exchange of image/audio information with a user device in the helper role or a proxy server combining images/audio from one or more helper devices. Accordingly, latency can be minimized for the device in the operator role as transmission through a third-party central server can be avoided. In an aspect, a device assuming the operator role can be utilized by a user functioning in an active role such as a task performer. As an example, a task performer could be performing a surgery, repairing advanced machinery, inspecting an automobile, operating a complex device, or similar. As such, the task performer desires low video/audio latency. High levels of video/audio latency can lead to imprecise task completion and frustration on the part of the user. In another aspect, a device in the operator role may additionally send its locally captured images/audio to a computing device to allow for processing and dispersion to one or more devices designated in a subscriber role.

In an aspect, the helper role can define (e.g., be associated with, cause to be invoked, implement, etc.) a transmission rule comprising one or more aspects for managing ingress and egress of image and audio information associated with a respective device of a plurality of devices. A device in the helper role or a proxy server combining images/audio from one or more devices designated in the helper role can perform peer-to-peer exchange of image/audio information with a user device in the operator role. A device assuming the helper role can function as a device for a remote expert, for example, a knowledgeable or highly trained individual assisting a less skilled or knowledgeable individual. In certain instances, increased latency may tolerable for the remote expert user, as he is generally not attempting to physically complete a task. If there is more than one device in the helper role, a proxy server may be used to perform combined processing and send/receive. In doing this, infrastructure/system bandwidth requirements are reduced and processing is offloaded from the helper devices. A device in the helper role or a proxy server combining images/audio from one or more helpers may additionally send images/audio to a computing device for processing and dispersion to one or more devices designated as subscriber.

The subscriber role can define a transmission rule comprising one or more aspects for managing ingress and egress of image and audio information associated with a respective device of a plurality of devices. A device in the subscriber role can receive image/audio information from a computing device performing some degree of image processing. In general, a user of a device in the subscriber role passively watches, but does not actively participate in, the completion of task. Thus, increased latency is generally tolerable.

The sender role can define a transmission rule comprising one or more aspects for managing ingress and egress of image and audio information associated with a respective device of a plurality of devices. A device in the sender role will generally send image/audio information to a device in the helper role performing some degree of image processing. In general, a user of a device in the sender role passively sends image/audio information.

In an aspect, a transmission rule can relate to managing ingress and egress of image and audio information associated with a respective device of a plurality of devices. As an example, the transmission rule can define bandwidth limits for one or more devices. In an aspect, when network traffic to/from a device reaches a bandwidth limit, the transmission rule can define an operational protocol to reduce the traffic load associated with the device. As an example, an operational protocol associated with a transmission rule can comprise transmitting a message, document, or procedure-based communication rather than the content itself.

In an aspect, transmission of the message, document, or procedure-based communication can be initiated by one or more devices to one or more other devices to indicate/effect changes to roles or the common field. As an example, updates regarding changes in the role of one or more devices can be transmitted to one or more other devices. As another example, a device in an administrator role can propagate a message to one or more other devices with an instruction to view a particular image or texture with a desired transparency/opacity. As a further example, updates regarding the in-session presence of one or more other devices can be transmitted to one or more other devices.

Figure 7A:
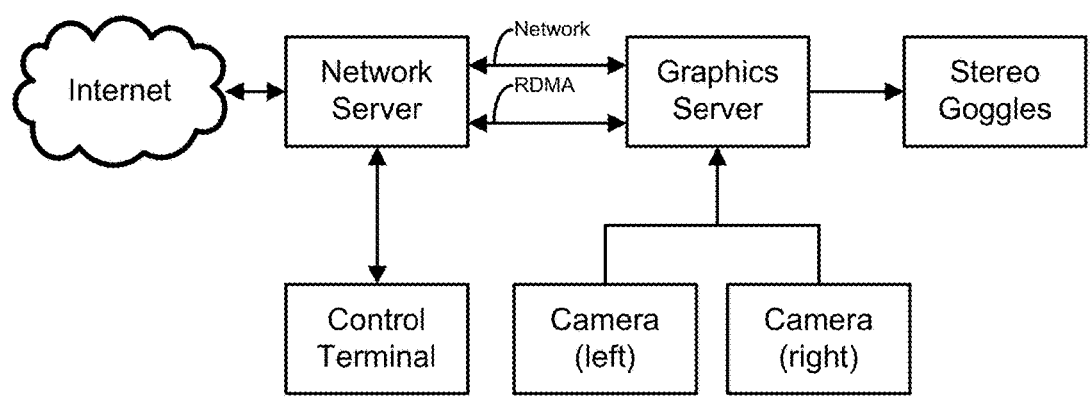
FIG. 7A illustrates an exemplary virtual presence system.

FIG. 7A illustrates an exemplary virtual presence system. One such system can be used by each remote participant that is to join the same session. Each system can communicate with each other through a network connection. For example, remote sites can connect via the internet. Tasks can be divided amongst a plurality of computers in each system. For example, one computer (a graphics server) can gather images from local cameras and a network server, perform the stereo image composition tasks, and drive a local stereoscopic display system. As a further example, the processor(s) 310 of system 300 can be embodied by the graphics server.

Figure 7B:
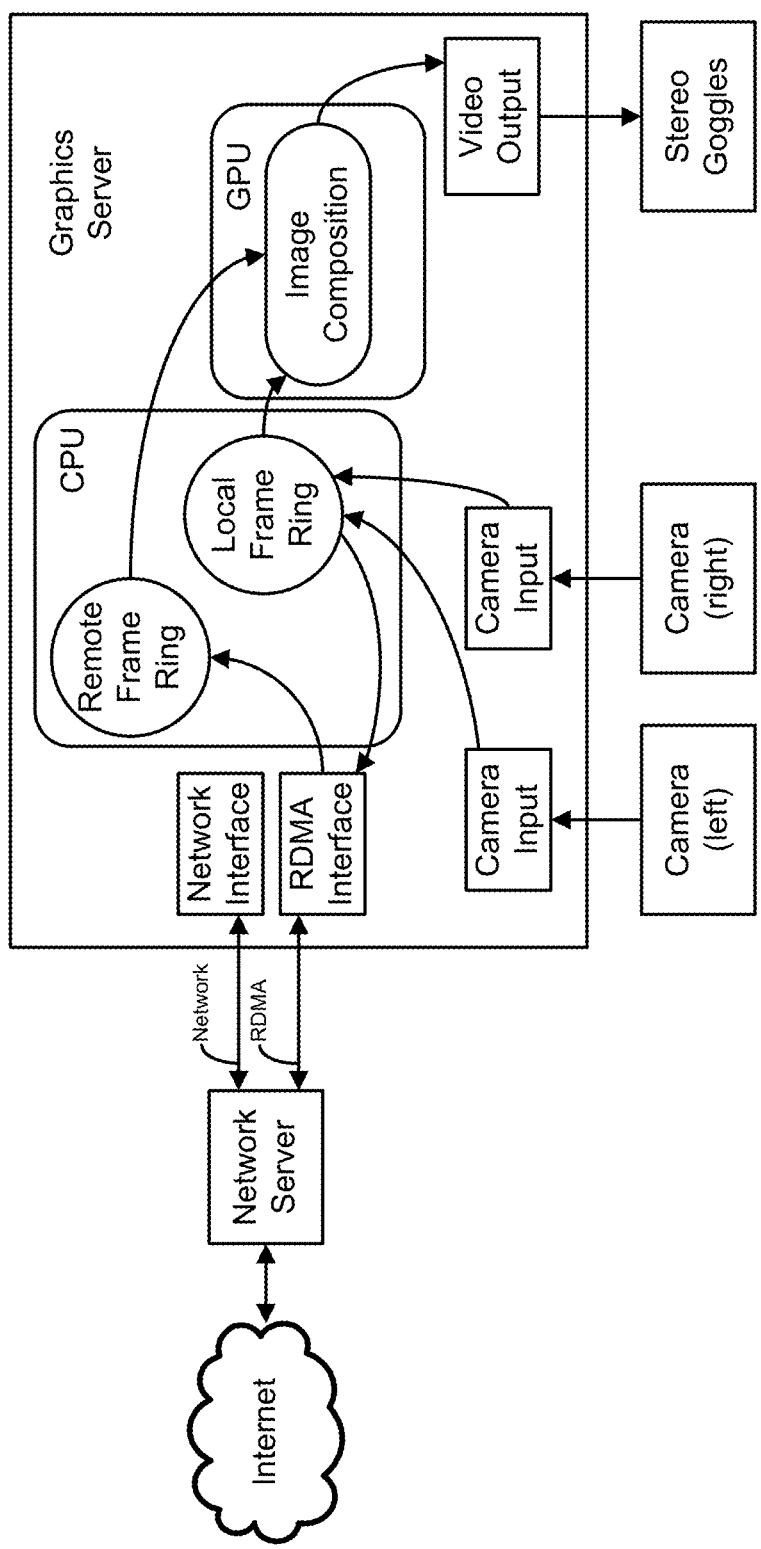
FIG. 7B illustrates exemplary processes performed within a graphics server.

FIG. 7B illustrates exemplary processes that can be performed with the graphics server. Images can be gathered into local data structures (frame rings). Local images can be gathered from a plurality of cameras, for example two cameras. Remote images can be provided by the network server via a high-speed remote direct memory access (RDMA) connection, for example. These images can be combined so that the remote user and the local user can be seen in the same scene (as in FIG. 3). This composite result can be transmitted to a local stereoscopic display system. A second computer can act as the network server, which can perform network encoding/decoding tasks as well as depth map generation, for example.

Figure 7C:
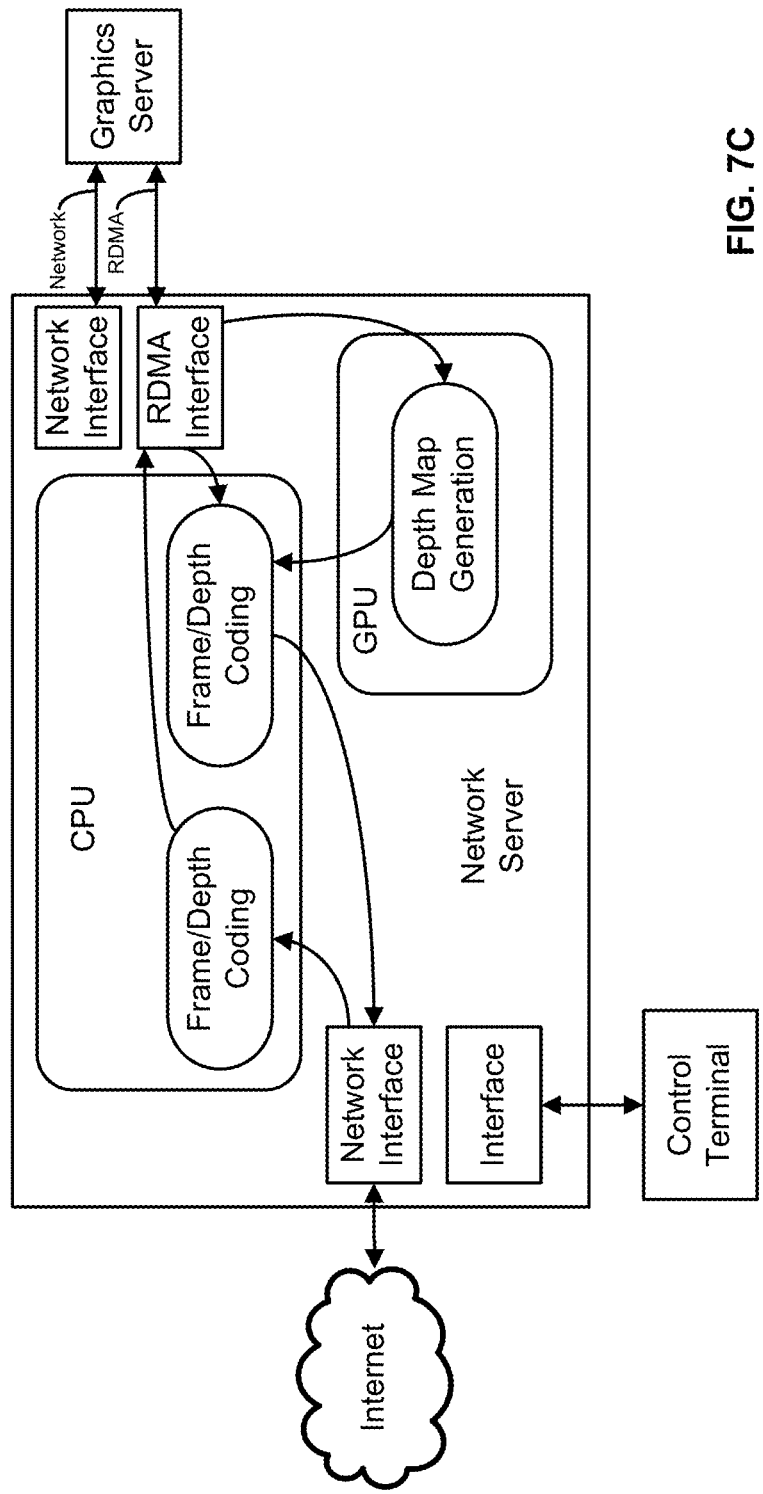
FIG. 7C illustrates exemplary processes performed within a network server.

FIG. 7C illustrates exemplary processes that can be performed with the network server. Local images gathered from the graphics server via the RDMA connection can be analyzed and mapped with depth information, encoded for efficient network transmission, and sent to an external network connection to be received by a corresponding network server at the remote site. Simultaneously, encoded images and depth maps can be received from the remote site, decoded, and provided to the local graphics server via the RDMA connection.

The system can be user-controlled by a control terminal connected to the network server; the user can then access and control the graphics server via the dedicated network connection to the network server.

Parameters of virtual interactive presence can be configured depending on the system used. Configurable parameters include, but are not limited to, size of virtual elements, presence of virtual elements (opaque, translucent, etc.), time of virtual presence (time can be configured to be delayed, slowed, increased, etc.), superimposition of elements such that any combination of virtual and real can be superimposed and/or 'fitted' over one another, and the like.

Figure 8:
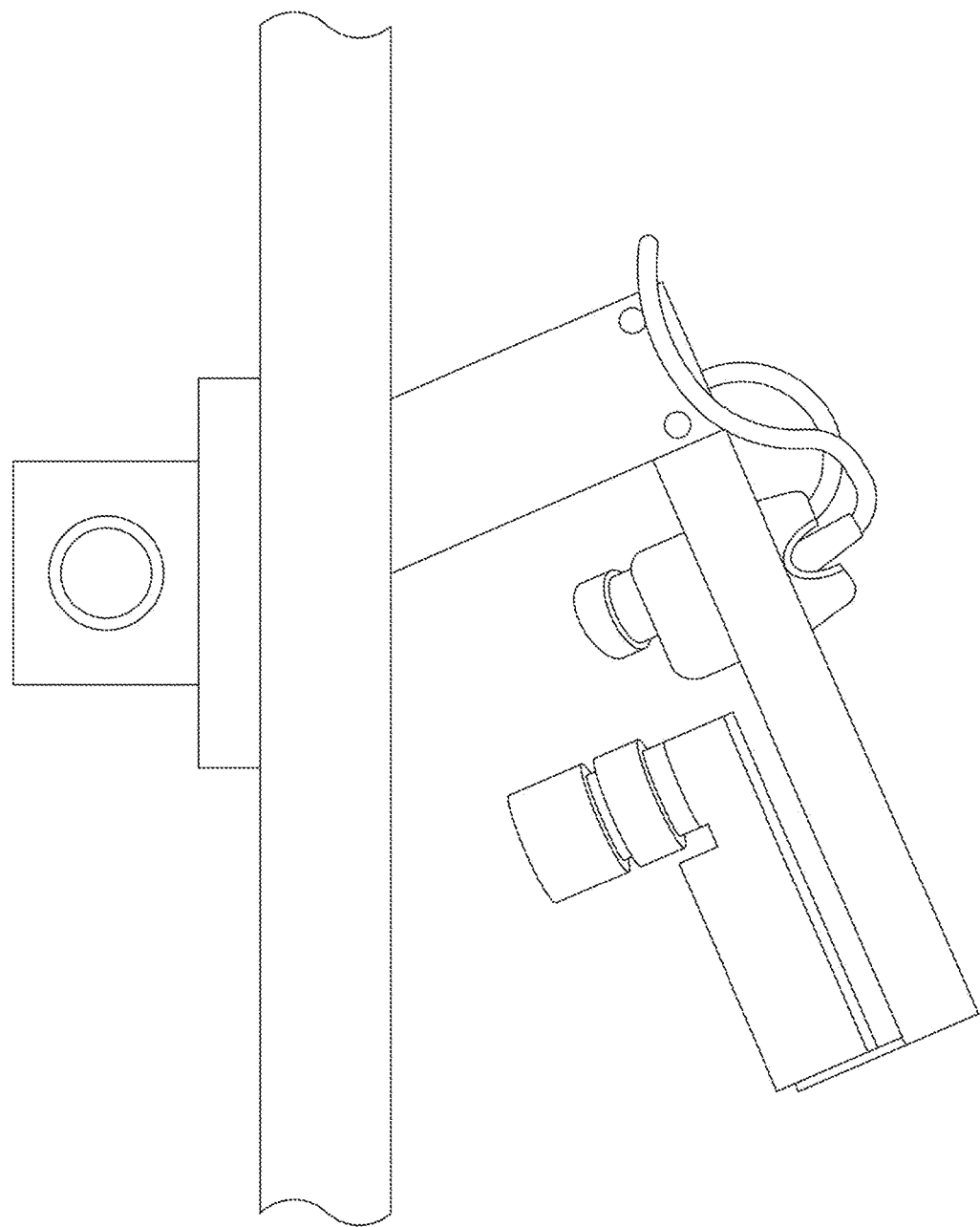
FIG. 8 illustrates a side view of an exemplary VIP display.
Figure 9:
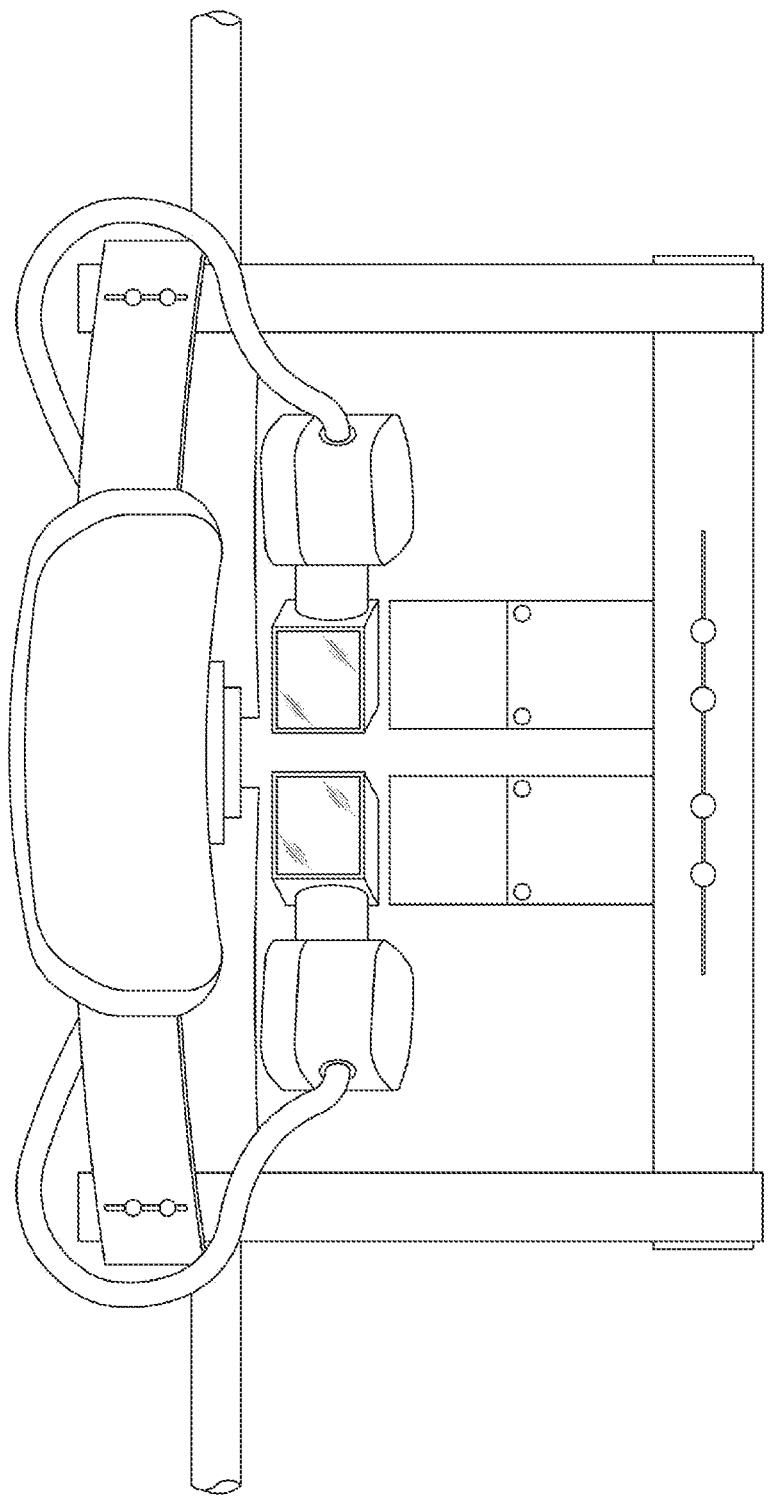
FIG. 9 illustrates a user's view of an exemplary VIP display.
Figure 10:
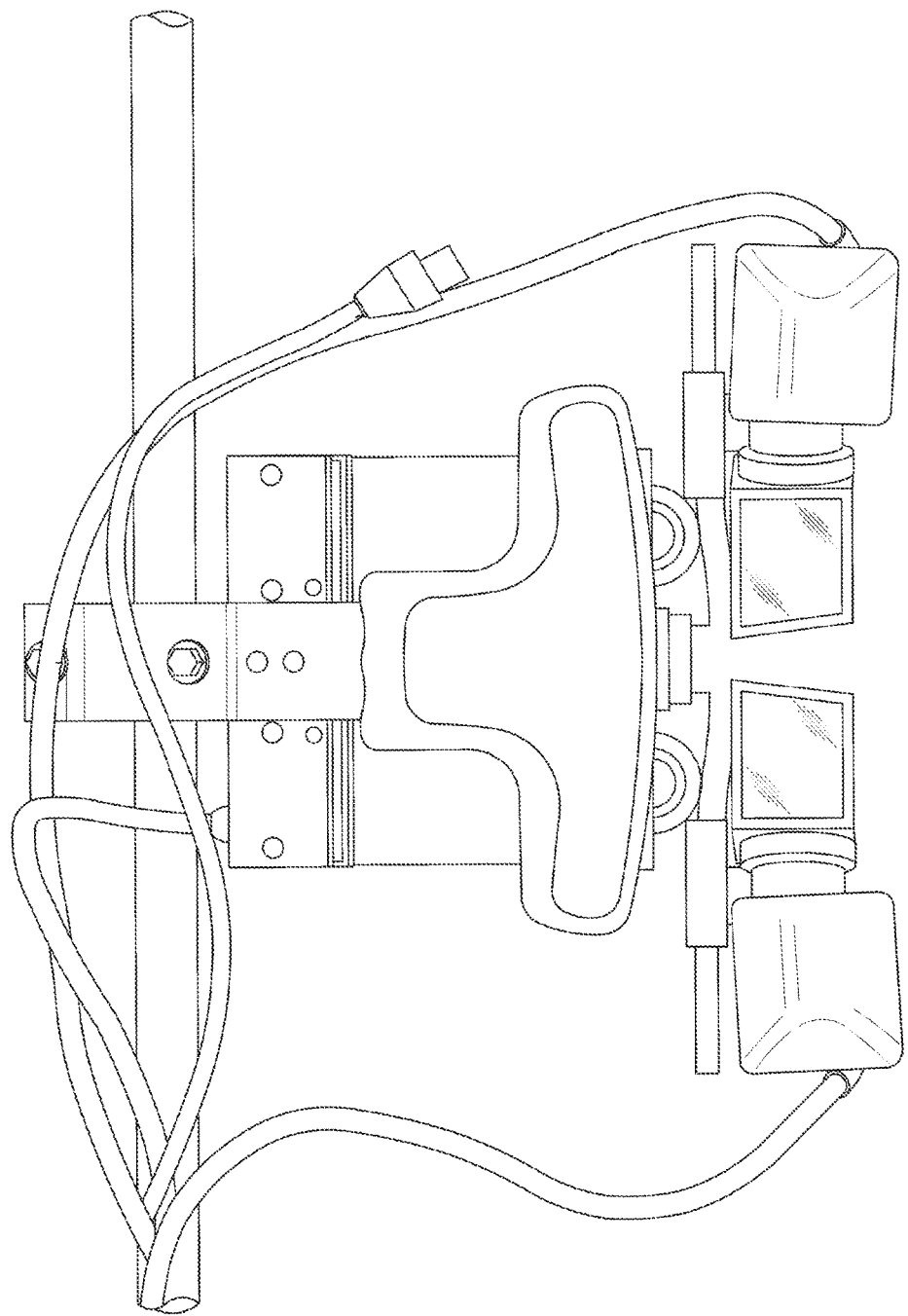
FIG. 10 illustrates a user's view of an exemplary VIP display.

FIG. 8 illustrates a side view of an exemplary VIP display. FIG. 9 illustrates a user's view of an exemplary VIP display. FIG. 10 illustrates a user's view of an exemplary VIP display.

As used herein, a "local" field of interest can refer to a local physical field and local user, thus making every other field remote. Each field can be local to its local physical user, but remote to other users. The composite of the fields can be a common field of interest. This is distinct from common "virtual worlds" in that there can be components of "real" within the local rendering of the common field of interest and interactions can be between actual video (and other) renderings of physical objects and not just graphic avatars representing users and objects. The methods and systems provided allow for virtual interactive presence to modify/optimize a physical domain by the interplay of real and virtual.

Figure 11:
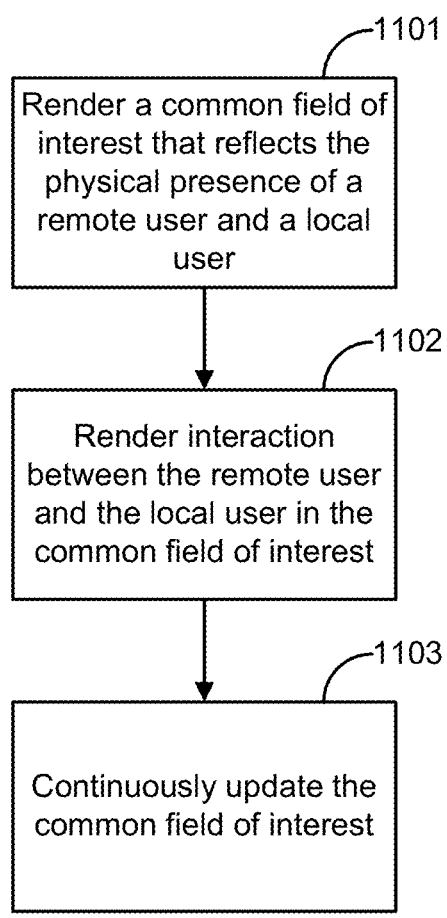
FIG. 11 illustrates an exemplary method.

In an aspect, illustrated in FIG. 11, provided are methods for virtual interactive presence comprising rendering a common field of interest that reflects the physical presence of a remote user and a local user at 1101, rendering interaction between the remote user and the local user in the common field of interest at 1102, and continuously updating the common field of interest such that the presence of the remote user is rendered in real time to the local user and the presence of the local user is rendered in real time to the remote user at 1103.

The common field of interest can be rendered such that the remote user experiences the common field of interest similarly to the local user. The local user can experience the remote user's physical presence in a manner that enables continuous interaction in the common field of interest with the remote user. The methods can further comprise rendering the physical presence of a local object in the common field and rendering interaction between the local user and the local object in the common field. The methods can further comprise rendering the physical presence of a local object in the common field of interest and rendering interaction between the remote user and the local object in the common field of interest.

Figure 12:
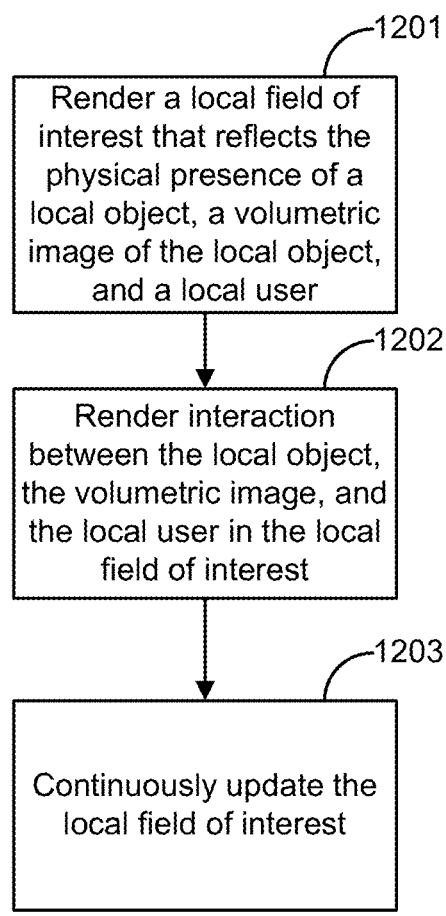
FIG. 12 illustrates another exemplary method.

In another aspect, illustrated in FIG. 12, provided are methods for virtual interactive presence comprising rendering a local field of interest that reflects the physical presence of a local object, a volumetric image of the local object, and a local user at 1201, rendering interaction between the local object, the volumetric image, and the local user in the local field of interest at 1202, and continuously updating the local field of interest such that the presence of the local object and the volumetric image of the local object is rendered in real time to the local user at 1203.

The local object can be, for example, a patient and the volumetric image of the local object can be, for example, a medical image of a part of the patient. However, the local object can be any object of interest and the image of the local object can be any accurate rendering of that object. For example, could be an automobile engine and a 3D graphic of the engine, etc.

The medical image can be, for example, one of, an x-ray image, an MRI image, or a CT image. The methods can further comprise superimposing, by the local user, the volumetric image onto the local object. The superimposition can be performed automatically by a computer.

The methods can further comprise adjusting, by the local user, a property of the volumetric image. The property can be one or more of transparency, spatial location, and scale.

The methods can further comprise rendering a local tool in the local field of interest. The methods can further comprise rendering the local tool in accurate spatial relation to the rendering of the local object. The tool can be any type of tool, for example, a surgical tool.

In another aspect, provided are systems for virtual presence, comprising a virtual presence display, configured for displaying a common field of interest, a local sensor, configured for obtaining local virtual presence data, a network interface, configured for transmitting local virtual presence data and receiving remote virtual presence data, and a processor, coupled to the virtual presence display, the local sensor, and the network interface, wherein the processor is configured to perform steps comprising, rendering a common field of interest that reflects the physical presence of a remote user and a local user based on the local virtual presence data and the remote virtual presence data, rendering interaction between the remote user and the local user in the common field of interest, continuously updating the common field of interest such that the presence of the remote user is rendered in real time to the local user and the presence of the local user is rendered in real time to the remote user, and outputting the common field of interest to the virtual presence display.

The virtual presence display can be one or more of a stereoscopic display, a monoscopic display (such as a CRT, LCD, etc.), and the like. The sensor can be one or more of a camera, an infrared sensor, a depth scan sensor, and the like. The common field of interest can be rendered such that the remote user experiences the common field of interest similarly to the local user. The local user can experience the remote user's physical presence in a manner that enables continuous interaction in the common field of interest with the remote user.

The processor can be further configured to perform steps comprising rendering the physical presence of a local object in the common field of interest and rendering interaction between the local user and the local object in the common field of interest.

The processor can be further configured to perform steps comprising rendering the physical presence of a local object in the common field of interest and rendering interaction between the remote user and the local object in the common field of interest.

Further provided are systems for virtual presence, comprising a virtual presence display, configured for displaying a local field of interest, a local sensor, configured for obtaining local virtual presence data, a processor, coupled to the virtual presence display and the local sensor, wherein the processor is configured to perform steps comprising, rendering a local field of interest that reflects the physical presence of a local object and a local user based on the local virtual presence data and a volumetric image of the local object, rendering interaction between the local object, the volumetric image, and the local user in the local field of interest, continuously updating the local field of interest such that the presence of the local object and the volumetric image of the local object is rendered in real time to the local user, and outputting the local field of interest to the virtual presence display.

The virtual presence display can be one or more of a stereoscopic display, a monoscopic display (such as a CRT, LCD, etc.), and the like. The sensor can be one or more of a camera, an infrared sensor, a depth scan sensor, and the like.

The local object can be, for example, a patient and the volumetric image of the local object can be, for example, a medical image of a part of the patient. The medical image can be, for example, one of, an x-ray image, an MRI image, or a CT image. However, the local object can be any object of interest and the image of the local object can be any accurate rendering of that object. For example, could be an automobile engine and a 3D graphic of the engine, etc.

The processor can be further configured to perform steps comprising superimposing, by the local user, the volumetric image onto the local object. The processor can be further configured to perform steps comprising adjusting, by the local user, a property of the volumetric image. The property can be one or more of transparency, spatial location, and scale.

The processor can be further configured to perform steps comprising rendering a local tool in the local field of interest. The processor can be further configured to perform steps comprising rendering the local tool in accurate spatial relation to the rendered local object.

The disclosed methods and systems can have broad applications. For example, surgery, gaming, mechanics, munitions, battle field presence, instructional efforts (training) and/or any other situation where interaction is part of the scenario.

Also disclosed are methods and systems that enable a remote expert to be virtually present within a local surgical field. Virtual interactive presence can be used to enable two surgeons remote from each other to interactively perform a surgical procedure. The methods and system enable two or more operators to be virtually present, and interactive, within the same real operative field, thus supporting remote assistance and exporting surgical expertise.

The methods and systems can also be used to superimpose imaging data of the operative anatomy onto the anatomy itself for guidance and orientation (augmented reality). The methods and systems can be used for training of students. The methods and systems augment and enhance the field of robotics by virtually bringing an expert into the robotic field to guide the robot operator. The methods and systems are applicable to endoscopic procedures by inserting the expert's hands directly into the endoscopic field for guidance. The methods and systems expand remote surgery by providing the assistance of a remote expert to an actual local surgeon, whose basic skills can handle emergencies, and who will learn from the virtual interaction. The methods and systems can be used at trauma sites and other medical environments. The methods and systems can be used to provide remote assistance in other areas such as engineering, construction, architecture, and the like. The methods and systems disclosed can be used to transmit expertise to a remote 'site of need', merge contemporary imaging directly into the surgical field, and train surgical students An exemplary remote surgical assistance system for transmitting surgical maneuvers of a local expert to a remote surgeon for the purpose of guiding/assisting the remote surgeon is illustrated in FIG. 13. The remote surgical field can be viewed by the remote surgeon with a binocular video system. The video system can show the field with his hands and instruments performing the procedure. The viewing system can be referred to as a surgical videoscope.

The binocular video rendering of the remote field can be transmitted to the local expert), who can view the (now virtual) stereoscopic rendering of the procedure through a second surgical videoscope system. The local expert can insert his hands into the virtual field, thus seeing his real hands within the virtual field.

The video image of the local expert's hands can be transmitted back to the remote surgeon's surgical videoscope system superimposed into the real field. The remote surgeon can then see the expert's virtual hands within his surgical field in a spatially/anatomically relevant context. With this system, the local expert can use his hands to show the remote surgeon how to perform the case.

Exemplary elements of the system can comprise a remote station where the remote surgeon can perform the operative procedure, a remote surgical videoscope system comprised of, for example, a fixed stereoscopic videoscope that may resemble a mounted microscope. This apparatus can be used by the remote surgeon to view the operative field. Any other type of suitable VIP display can be used. The system can project the binocular video image to a similar local surgical videoscope at a local station. The local surgical videoscope can receive the binocular video image of the remote procedure and allow the local expert to view it. The local videoscope can view the local surgeons hands as they move within the virtual remote field as viewed through the local videoscope. The local videoscope can then transmit the local expert's hands back to the remote videoscope so that the remote surgeon can see the expert's virtual hands within the real field.

With this system, the local expert can show the remote surgeon the appropriate maneuvers that result in successful completion of the case. The remote surgeon can have a basic skill set to carry out the new procedure. Therefore, the local expert can simply demonstrates to the remote surgeon new ways to apply the skill set. This system does not have to supplant the remote surgeon, but can be used to enhance his/her capability. The remote surgeon can be on hand to rapidly deal with any emergencies. Time delay is minimized because the remote surgeon can use his/her own hands to perform the task, eliminating the need for the local expert to manipulate remote robotic apparatuses.

Also disclosed are methods and systems for merging contemporary medical imaging onto an operative field. A volume image can be obtained of the operative field. For example, a volume MRI of the head, prior to the surgical procedure. The image data can be reconstructed into a three dimensional rendering of the anatomy. This rendering can be transmitted to the surgical videoscope that will be used to view the operative field. Through the videoscope, the surgeon can view this 3D rendering in a translucent manner superimposed onto the surgical field. In this case, the surgeon would see a rendered head superimposed on the real head. Using software tools in the surgical videoscope interface, the surgeon can rotate and scale the rendered image until it "fits" the real head. The videoscope system can allow the surgeon to differentially fade the rendered head and real head so that the surgeon can "look into" the real head and plan the surgery.

Exemplary elements of the system can comprise a surgical videoscope viewing system through which the surgeon views the surgical field. A computer for reconstruction of a volume-acquired MRI/CT (or other) image with sufficient resolution to enable matching it to the real surgical anatomy. The volume rendered image can be displayed through the videoscope system so that the surgeon can see it stereoscopically. A software interface can enable the surgeon to vary the translucency of the rendered and real anatomy so that the rendered anatomy can be superimposed onto the real anatomy. The surgeon can "open up" the rendered anatomy to view any/all internal details of the image as they relate to the real anatomy. Surgical tools can be spatially registered to the rendered anatomy so that behavior can be tracked and applied to the image.

As shown in FIG. 14, an example of such a task is placing small objects inside a jar of dark gelatin so that they are not visible to the surgeon. The task is for the surgeon to use a long forceps to reach into the gelatin and touch or grasp the objects. The Surgical Videoscope system can obtain a volume scan of the gelatin jar and render the jar in three dimensions and display a binocular rendering through the videoscope. The surgeon can view the rendering and the real jar through the scope system and fit the rendered jar onto the real jar. By differentially adjusting translucency, the surgeon can reach into the real jar with a forceps and grasp a selected object, while avoiding other designated objects.

The grasping instrument can be spatially registered onto the volumetric rendering of the surgical field, thereby allowing a graphic of the tool to be displayed on the rendering of the surgical field in appropriate anatomic orientation. This can provide enhanced guidance. This can be implemented by touching designated landmarks on the real object (jar) with a digitizer that communicates with the image rendering system, thus defining the object/probe relationship. Because the object (jar) is registered to the image of the jar by superimposition, a graphic of the probe can be displayed in relation to the image of the jar enabling virtual surgery.

There are many situations in which the present system can be used. For example, remote surgery, medical training, and tele-medicine, which can be used for third world countries or in a military situation. Surgeons remotely located from patients can assist other surgeons near the patient, can assist medics near the patient, and can perform surgical operations when coupled to a robotic surgery system. Other examples include, augmented or enhanced surgery—normal surgery using virtual environments, an example of which is endoscopic surgery. Surgical procedures can also be simulated. Surgeons located remote from each other may plan and practice a procedure before carrying out the operation on a real patient.

Other applications include the preparation of patient before surgery, medical therapy, preventative medicine, exposure therapy, reducing phobias, training people with disabilities and skill enhancement, and the like.

The viewer then views the projection through passive stereoscopic polarized glasses (similar to sunglasses) that route the left-eye image to the left eye, and the right-eye image to the right eye. This provides an illusion of stereopsis when the correctly-offset images are properly rendered by the software. The system can be replaced by other types of stereoscopic displays with no functional detriment to the system. The stereoscopic display can comprise at least two display projectors fitted with polarizing lenses, a back-projection screen material that maintains light polarization upon diffusion, special glasses that restrict each eye to see only light of a particular polarization, and the viewer. The image to be viewed can be rendered with two slightly different view transformations, reflecting the different locations of the ideal viewer's two eyes. One projector displays the image rendered for the left eye's position, and the other projector displays the image rendered for the right eye's position. The glasses restrict the light so that the left eye sees only the image rendered for it, and the right eye sees only the image rendered for it. The viewer, presented with a reasonable stereoscopic image, will perceive depth.

Figure 15:
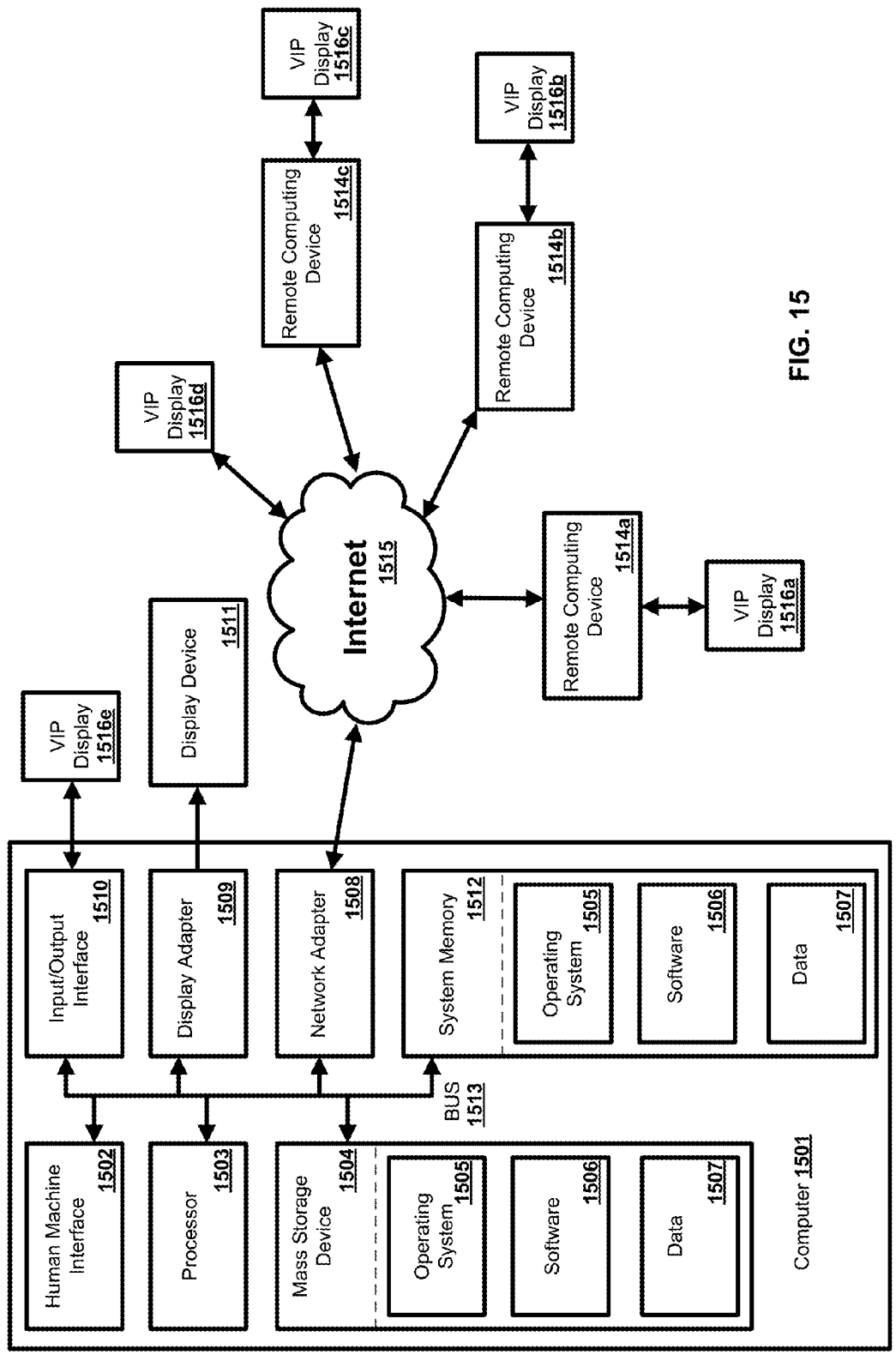
FIG. 15 illustrates an exemplary operational environment.

FIG. 15 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The methods can be operational with numerous other general purpose or special purpose computing system environments or configurations. Examples of well known computing systems, environments, and/or configurations that may be suitable for use with the system and method include, but are not limited to, personal computers, server computers, laptop devices, and multiprocessor systems. Additional examples include set top boxes, programmable consumer electronics, network PCs, minicomputers, mainframe computers, distributed computing environments that include any of the above systems or devices, and the like.

The methods may be described in the general context of computer instructions, such as program modules, being executed by a computer. Generally, program modules include routines, programs, objects, components, data structures, etc. that perform particular tasks or implement particular abstract data types. The system and method may also be practiced in distributed computing environments where tasks are performed by remote processing devices that are linked through a communications network. In a distributed computing environment, program modules may be located in both local and remote computer storage media including memory storage devices.

The methods disclosed herein can be implemented via one or more general-purpose computing devices in the form of a computer 1501. The components of the computer 1501 can include, but are not limited to, one or more processors or processing units 1503, a system memory 1512, and a system bus 1513 that couples various system components including the processor 1503 to the system memory 1512.

The system bus 1513 represents one or more of several possible types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus. This bus, and all buses specified in this description can also be implemented over a wired or wireless network connection. The bus 1513, and all buses specified in this description can also be implemented over a wired or wireless network connection and each of the subsystems, including the processor 1503, a mass storage device 1504, an operating system 1505, application software 1506, data 1507, a network adapter 1508, system memory 1512, an Input/Output Interface 1510, a display adapter 1509, a display device 1511, and a human machine interface 1502, can be contained within one or more remote computing devices 1514a,b,c at physically separate locations, connected through buses of this form, in effect implementing a fully distributed system.

The computer 1501 typically includes a variety of computer readable media. Such media can be any available media that is accessible by the computer 1501 and includes both volatile and non-volatile media, removable and non-removable media. The system memory 1512 includes computer readable media in the form of volatile memory, such as random access memory (RAM), and/or non-volatile memory, such as read only memory (ROM). The system memory 1512 typically contains data such as data 1507 and/or program modules such as operating system 1505 and application software 1506 that are immediately accessible to and/or are presently operated on by the processing unit 1503.

The computer 1501 may also include other removable/non-removable, volatile/non-volatile computer storage media. By way of example, FIG. 15 illustrates a mass storage device 1504 which can provide non-volatile storage of computer code, computer readable instructions, data structures, program modules, and other data for the computer 1501. For example, a mass storage device 1504 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Any number of program modules can be stored on the mass storage device 1504, including by way of example, an operating system 1505 and application software 1506. Each of the operating system 1505 and application software 1506 (or some combination thereof) may include elements of the programming and the application software 1506. Data 1507 can also be stored on the mass storage device 1504. Data 1507 can be stored in any of one or more databases known in the art. Examples of such databases include, DB2®, Microsoft® Access, Microsoft® SQL Server, Oracle®, mySQL, PostgreSQL, and the like. The databases can be centralized or distributed across multiple systems.

A user can enter commands and information into the computer 1501 via an input device (not shown). Examples of such input devices include, but are not limited to, a keyboard, pointing device (e.g., a "mouse"), a microphone, a joystick, a serial port, a scanner, tactile input devices such as gloves, and other body coverings, and the like. These and other input devices can be connected to the processing unit 1503 via a human machine interface 1502 that is coupled to the system bus 1513, but may be connected by other interface and bus structures, such as a parallel port, game port, or a universal serial bus (USB).

A display device 1511 can also be connected to the system bus 1513 via an interface, such as a display adapter 1509. A computer 1501 can have more than one display adapter 1509 and a computer 1501 can have more than one display device 1511. For example, a display device can be a monitor, an LCD (Liquid Crystal Display), or a projector. In addition to the display device 1511, other output peripheral devices can include components such as speakers (not shown) and a printer (not shown) which can be connected to the computer 1501 via Input/Output Interface 1510.

The computer 1501 can operate in a networked environment using logical connections to one or more remote computing devices 1514*a,b,c*. By way of example, a remote computing device can be a personal computer, portable computer, a server, a router, a network computer, a peer device or other common network node, and so on. Logical connections between the computer 1501 and a remote computing device 1514*a,b,c* can be made via a local area network (LAN) and a general wide area network (WAN). Such network connections can be through a network adapter 1508. A network adapter 1508 can be implemented in both wired and wireless environments. Such networking environments are commonplace in offices, enterprise-wide computer networks, intranets, and the Internet 1515.

One or more VIP displays 1516*a,b,c,d,e* can communicate with the computer 1501. In one aspect, VIP display 1516*e* can communicate with computer 1501 through the input/output interface 1510. This communication can be wired or wireless. Remote VIP displays 1516*a,b,c* can communicate with computer 1501 by communicating first with a respective remote computing device 1514*a,b,c* which then communicates with computer 1501 through the network adapter 1508 via a network such as the Internet 1515. Remote VIP display 1516*d* can communicate with computer 1501 without the need for a remote computing device. Remote VIP display 1516*d* can communicate via a network, such as the Internet 1515. The VIP displays 1516*a,b,c,d,e* can communicate wireless or through a wired connection. The VIP displays 1516*a,b,c,d,e* can communicate individual or collectively as part of a VIP display network.

For purposes of illustration, application programs and other executable program components such as the operating system 1505 are illustrated herein as discrete blocks, although it is recognized that such programs and components reside at various times in different storage components of the computing device 1501, and are executed by the data processor(s) of the computer. An implementation of application software 1506 may be stored on or transmitted across some form of computer readable media. Computer readable media can be any available media that can be accessed by a computer. By way of example, and not limitation, computer readable media may comprise "computer storage media" and "communications media." "Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the inventive concepts or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made in the present methods and systems without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method for role negotiation comprising:
    rendering a common field of interest that reflects a presence of a plurality of elements, wherein at least one of the elements is a remote element located remotely from another of the elements;
    receiving a plurality of role designations, each role designation associated with one of a plurality of devices, wherein at least one of the plurality of devices is a remote device located remotely from another of the plurality of devices;
    updating the common field of interest based upon the plurality of role designations, wherein each of the plurality of role designations defines an interactive functionality associated with the respective device of the plurality of devices;
    receiving a role change request from a first device of the plurality of devices, wherein the role change request comprises a desired role and the desired role is independent of a location of the first device;

granting the role change request based upon one or more role designation rules;
updating the role designation associated with the first device to match the desired role in response to the granting the role change request;
outputting the common field of interest based on the updated role designation such that a display parameter of the common field of interest is dependent upon the updated role designation; and
establishing one or more communication links between the first device and one or more other devices of the plurality of devices, wherein the communication links are configured to facilitate one of unidirectional and multidirectional transmission based on the updated role designation associated with the first device and the role designation of at least one other of the plurality of devices;
wherein each of the role designations represents a construct that triggers a logical execution of one or more programs that, upon execution, affect one or more settings including:
the processing of image, audio, or video information presented to a user,
the transmission of images, audio, and/or video presented to a user, and
the presentation of a graphical user interface presented to a user;
wherein the settings are automatically applied upon granting of the role change request;
wherein each role designation defines a transmission rule for managing ingress and egress of information associated with the respective device of the plurality of devices, wherein the transmission rule comprises one or more of a latency parameter and a bandwidth parameter;
according to the transmission rule associated with each of the plurality of role designations, outputting the managed information associated with the respective device of the plurality of devices to a display of the respective device; and
outputting the common field of interest based on the updated role designation such that a display parameter of the common field of interest is dependent upon the updated role designation.

2. The method of claim 1, further comprising rendering the presence of each of the elements in real time, wherein each of the elements is registered relative to another of the elements.

3. The method of claim 1, further comprising the step of rendering interaction between the elements in the common field of interest.

4. The method of claim 1, wherein the plurality of role designations comprises one or more of an operator role, a helper role, a heads up role, a subscriber role, an administrator role, an active viewer role, and a sender role.

5. The method of claim 1, wherein interactive functionality comprises one or more of sending and receiving image data and wherein one or more of the plurality of role designations define a different interactive functionality compared to another of the role designations.

6. The method of claim 1, further comprising the step of calibrating the common field of interest by aligning a calibration feature of a remote field and a calibration feature of a local field.

7. The method of claim 1, wherein updating the common field of interest comprises modifying a display characteristic of one or more of the remote element and the local element.

8. The method of claim 1, further comprising transmitting a message to a user interface of the first device in response to the granting the role change request.

9. The method of claim 1, wherein when the operator role is designated, the local element is rendered either with a degree of transparency or with substantially full opacity.

10. The method of claim 9, wherein when the operator role is designated, the remote element is rendered with a degree of transparency.

11. The method of claim 1, wherein a heads up role may be designated, where one or more local images may be rendered in a plurality of a display screen of the first device, with one or more remote images displayed in a smaller window, or one or more remote images may be rendered in a majority of the display screen of the first device, with one or more local images displayed in a smaller window.

12. A method for role negotiation comprising:
generating a common field of interest that reflects a presence of a plurality of elements, wherein at least one of the elements is a remote element located remotely from another of the elements;
causing output of the common field of interest to a plurality of devices;
receiving a plurality of role designations, each role designation associated with one of the plurality of devices, wherein at least one of the plurality of devices is a remote device located remotely from another of the plurality of devices;
establishing one or more communication links between a first device and one or more other devices of the plurality of devices, wherein the communication links are configured to facilitate one of unidirectional and multidirectional transmission based on the role designation associated with the first device and the role designation of at least one other of the plurality of devices;
managing one or more of ingress and egress of information to one or more of the plurality of devices based upon one or more of the plurality of role designations, wherein each of the plurality of role designations defines a transmission rule for managing ingress and egress of information associated with the respective device of the plurality of devices, wherein the transmission rule comprises one or more of a latency parameter and a bandwidth parameter, and wherein the transmission rule defines a portion of image processing to be offloaded to a proxy server;
according to the transmission rule associated with each of the plurality of role designations, outputting the managed information associated with the respective device of the plurality of devices to a display of the respective device; and
outputting the common field of interest based on the updated role designation such that a display parameter of the common field of interest is dependent upon the updated role designation.

13. The method of claim 12, wherein the plurality of role designations comprises one or more of an operator role, a helper role, a heads up role, a subscriber role, an administrator role, an active viewer role, and a sender role.

14. The method of claim 12, wherein one or more of the plurality of role designations define a different transmission rule compared to another of the role designations.

15. The method of claim 12, wherein the information comprises one or more of audio information and image information.

16. The method of claim 12, wherein the transmission rule facilitates the establishment of one or more communication links between the respective device and one or more other devices of the plurality of devices, wherein the communication links are configured to facilitate one of unidirectional and multidirectional transmission based on the updated role designation associated with the respective device and the role designation of at least one other of the plurality of devices.

17. A system for role negotiation comprising:
a processor; and
a memory bearing instructions that, upon execution by the processor, cause the system at least to:
generate a common field of interest that reflects a presence of a plurality of elements, wherein at least one of the elements is a remote element located remotely from another of the elements;
receive a role designation;
manage one or more of the ingress and egress of information based upon the role designation;
update the common field of interest based upon the one or more of the ingress and egress of information;
output the updated common field of interest to the display;
receive a role change request from a first device of a plurality of devices, wherein the role change request comprises a desired role;
grant the role change request based upon one or more role designation rules;
update the role designation associated with the first device to match the desired role in response to the granting the role change request; and
establish one or more communication links between the first device and one or more other devices of the plurality of devices, wherein the communication links are configured to facilitate one of unidirectional and multidirectional transmission based on the updated role designation associated with the first device and the role designation of at least one other of the plurality of devices;
wherein each role designation defines a transmission rule for managing ingress and egress of information associated with the respective device of the plurality of devices, wherein the transmission rule comprises one or more of a latency parameter and a bandwidth parameter, and wherein the transmission rule defines a portion of image processing to be offloaded to a proxy server;
according to the transmission rule associated with each role designation, outputting the managed information associated with the respective device of the plurality of devices to the display; and
outputting the common field of interest based on the updated role designation such that a display parameter of the common field of interest is dependent upon the updated role designation.

18. The system of claim 17, wherein the processor is further configured to continuously update the common field of interest such that the presence of the remote element is rendered in real time to a local viewer.

19. The system of claim 17, wherein the information comprises one or more of audio information and image information.

20. The system of claim 17, wherein the role designation comprises one or more of an operator role, a helper role, a heads up role, a subscriber role, an administrator role, an active viewer role, and a sender role.

21. The system of claim 17, wherein receiving a role designation comprises determining a network characteristic comprising one or more of latency and bandwidth and selecting a role designation based on the determined network characteristic.

22. The system of claim 17, further comprising instructions that, upon execution by the processor, cause the system at least to: transmit a message to a user interface of the first device in response to the granting the role change request.

* * * * *